US011599665B2

(12) United States Patent
Post

(10) Patent No.: US 11,599,665 B2
(45) Date of Patent: Mar. 7, 2023

(54) CONTROLLING ACCESS TO A SECURE COMPUTING RESOURCE

(71) Applicant: NIKE, Inc., Beaverton, OR (US)

(72) Inventor: Justus Post, Portland, OR (US)

(73) Assignee: NIKE, Inc., Beaverton, OR (US)

(*) Notice: Subject to any disclaimer, the term of this patent is extended or adjusted under 35 U.S.C. 154(b) by 96 days.

(21) Appl. No.: 16/823,084

(22) Filed: Mar. 18, 2020

(65) Prior Publication Data

US 2020/0302086 A1    Sep. 24, 2020

Related U.S. Application Data

(60) Provisional application No. 62/820,771, filed on Mar. 19, 2019.

(51) Int. Cl.
G06F 21/62    (2013.01)
G06F 21/33    (2013.01)
G06Q 50/26    (2012.01)
G06Q 30/0201    (2023.01)

(52) U.S. Cl.
CPC ........ G06F 21/6245 (2013.01); G06F 21/335 (2013.01); G06Q 30/0201 (2013.01); G06Q 50/265 (2013.01); G06F 2221/2111 (2013.01); G06F 2221/2137 (2013.01)

(58) Field of Classification Search
CPC .................................................. G06F 21/6245
See application file for complete search history.

(56) References Cited

U.S. PATENT DOCUMENTS

| 7,895,445 | B1 | 2/2011 | Albanese et al. |
| 8,326,725 | B2 | 12/2012 | Elwell et al. |
| 8,583,511 | B2 | 11/2013 | Hendrickson |
| 8,898,742 | B2 | 11/2014 | Joyce et al. |
| 8,959,585 | B2 * | 2/2015 | Gur ........................ G06Q 10/02 726/2 |
| 9,106,650 | B2 | 8/2015 | Roesner et al. |
| 9,226,044 | B2 | 12/2015 | Daniels |

(Continued)

OTHER PUBLICATIONS

International Preliminary Report on Patentability received for PCT Patent Application No. PCT/US2020/023398, dated Sep. 30, 2021, 9 pages.

(Continued)

Primary Examiner — Simon P Kanaan
(74) Attorney, Agent, or Firm — Shook, Hardy & Bacon L.L.P.

(57) ABSTRACT

Aspects of the technology described herein provide for controlled access to a secure computing resource. A first device may receive a child token from a second device having a parent token. The child token may grant the first device access to a subset of data accessible to the second device. Based on a degree of physical proximity between the first device and a third device associated with a user satisfying a threshold proximity, an indication of a user identifier for the user may be received from the third device. A request for access to a secure computing resource associated with the user may be sent to the second device. The request may include the indication of the user identifier and an indication of the secure computing resource. Access to the secure computing resource may be granted based on the child token and the indication of the identifier.

20 Claims, 14 Drawing Sheets

(56) References Cited

U.S. PATENT DOCUMENTS

| | | | |
|---|---|---|---|
| 9,262,781 B2 | 2/2016 | Mackinnon Keith | |
| 9,672,509 B2 | 6/2017 | Klingen | |
| 9,747,631 B2 | 8/2017 | Paradise et al. | |
| 9,800,572 B2 | 10/2017 | Chapman | |
| 2005/0203885 A1 | 9/2005 | Chenevich et al. | |
| 2007/0256124 A1* | 11/2007 | Ih | G06F 21/335 726/9 |
| 2011/0078196 A1* | 3/2011 | Jorgensen | G06F 21/6218 707/783 |
| 2011/0154466 A1* | 6/2011 | Harper | G06Q 20/34 726/9 |
| 2012/0265671 A1* | 10/2012 | Higgins | H04L 9/3234 705/39 |
| 2012/0278146 A1 | 11/2012 | Nussel et al. | |
| 2013/0030915 A1 | 1/2013 | Statler et al. | |
| 2013/0218721 A1 | 8/2013 | Borhan et al. | |
| 2013/0221083 A1 | 8/2013 | Doss et al. | |
| 2014/0173695 A1 | 6/2014 | Valdivia | |
| 2015/0278548 A1 | 10/2015 | Brands | |
| 2015/0371303 A1 | 12/2015 | Suri et al. | |
| 2016/0335667 A1 | 11/2016 | Aubrey | |
| 2016/0380997 A1 | 12/2016 | Blasi et al. | |
| 2017/0126684 A1 | 5/2017 | Armknecht et al. | |
| 2017/0244696 A1 | 8/2017 | Lund et al. | |
| 2018/0308142 A1 | 10/2018 | Cook et al. | |
| 2018/0315110 A1 | 11/2018 | Kannan et al. | |
| 2020/0007554 A1* | 1/2020 | Vincent | H04L 63/105 |

OTHER PUBLICATIONS

International Search Report and Written Opinion received for PCT Patent Application No. PCT/US2020/023398, dated Jul. 13, 2020, 13 pages.

Extended European Search Report received for European Application No. 20774339.4, dated Nov. 21, 2022, 8 pages.

Faynberg et al., "On Dynamic Access Control in Web 2.0 and Beyond: Trends and Technologies", Bell Labs Technical Journal, vol. 16, No. 2, Available online at <https://doi.org/10.1002/bltj.20511>, Sep. 1, 2011, pp. 199-218.

* cited by examiner

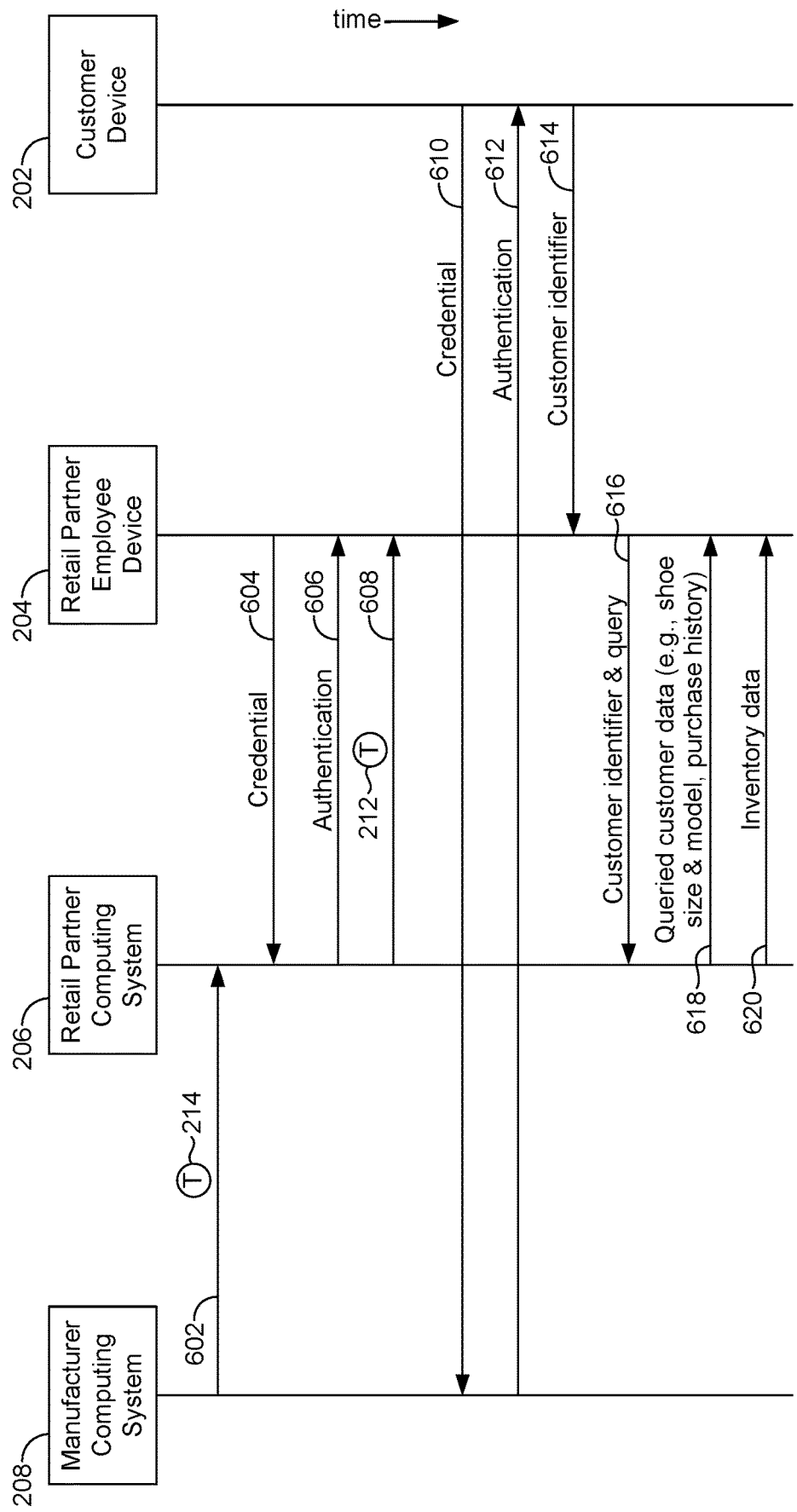

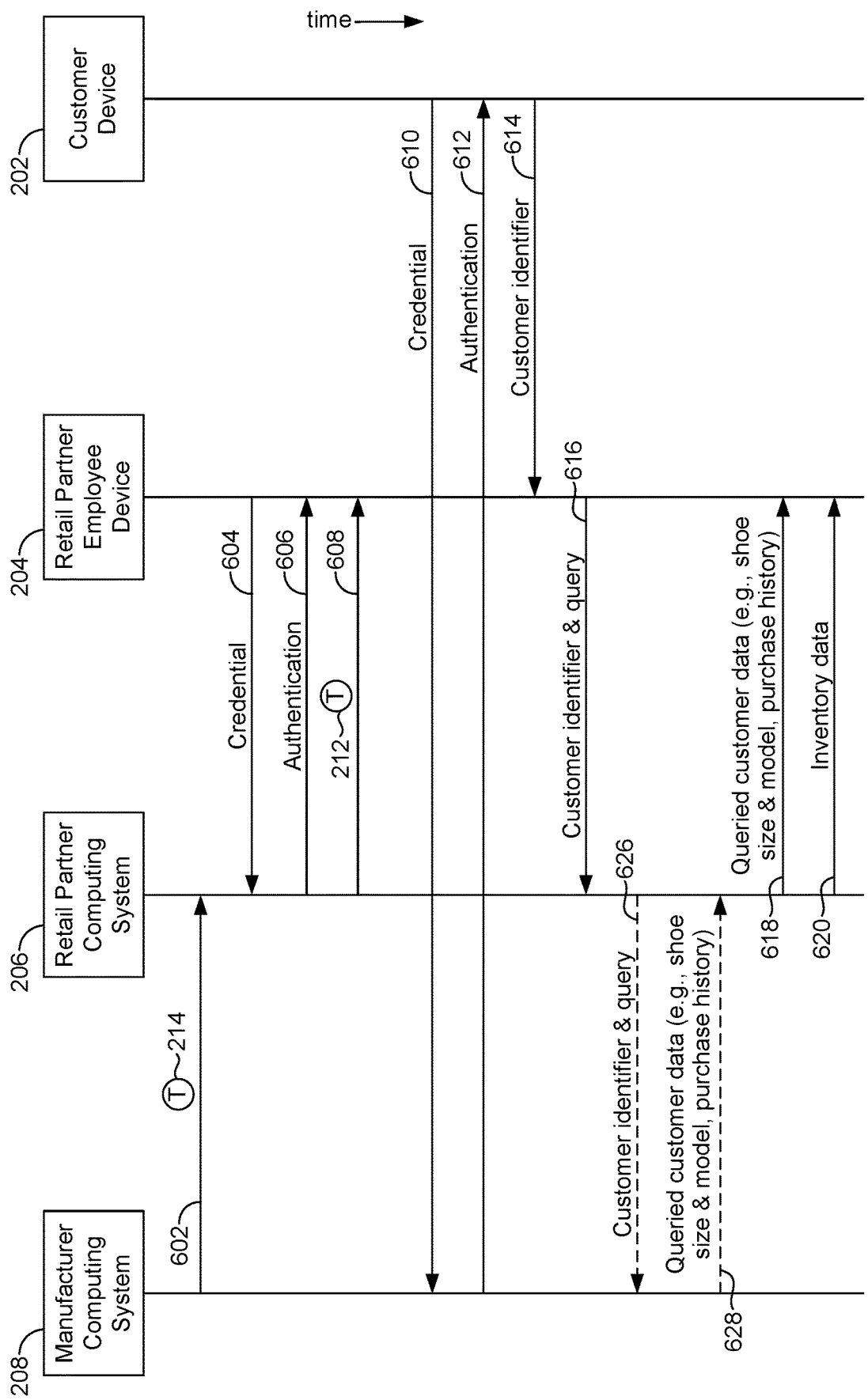

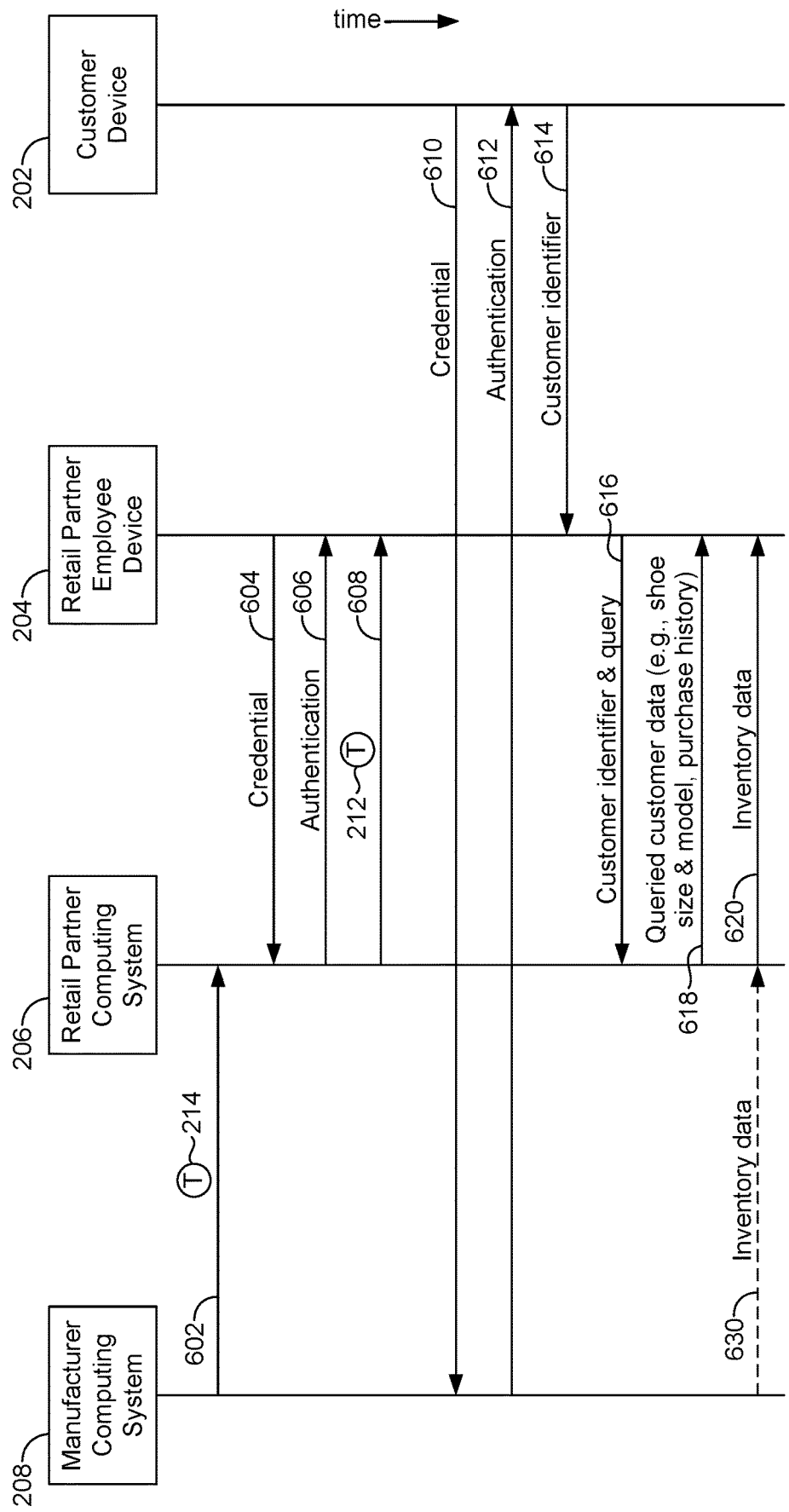

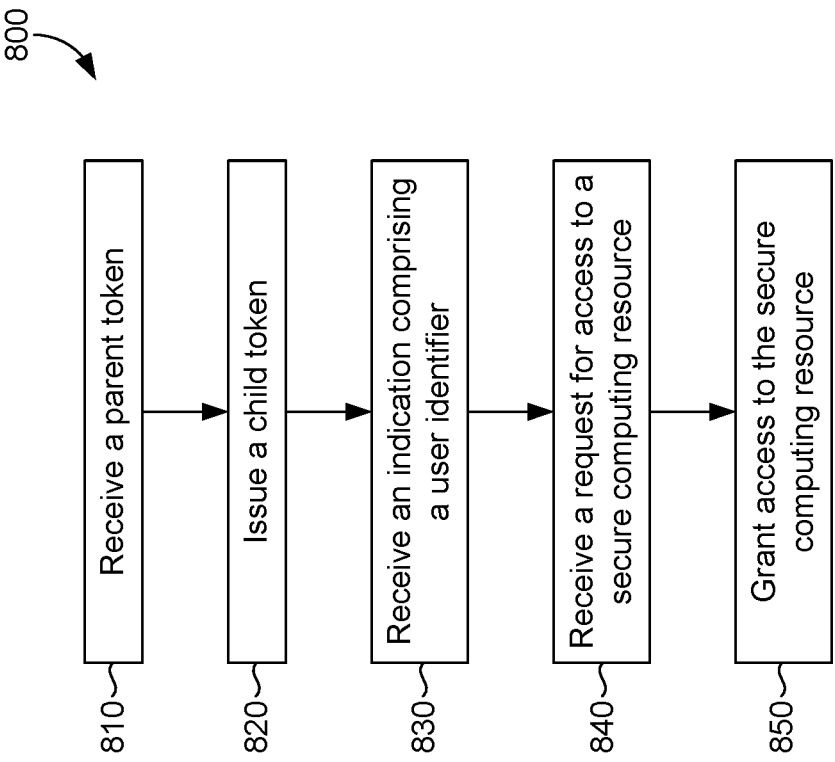

CONTROLLING ACCESS TO A SECURE COMPUTING RESOURCE

CROSS-REFERENCE TO RELATED APPLICATIONS

This application, entitled "Controlling Access To A Secure Computing Resource," claims priority to U.S. Provisional Patent Application No. 62/820,771, filed Mar. 19, 2019, and entitled, "Controlling Access To A Secure Computing Resource," the entirety of which is incorporated herein by reference.

TECHNICAL FIELD

This disclosure is related to computer security.

BACKGROUND

Consumers desire personalized retail experiences. A personalized experience may be provided for a particular consumer by leveraging data about the consumer, such as the consumer's purchase history data (e.g., the style and size of an item purchased, as well as the date on which it was purchased) or other consumer-approved actions and services in which the consumer is engaged with a company. A retailer or manufacturer may maintain such data about consumers of their products and services, and access to the data must be controlled in a manner that safeguards the data and the consumer's privacy.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein enables a manufacturer (or other supply chain entity) to provide a personalized experience for consumers of its products, regardless of where or when a product or service is purchased. A consumer purchasing a manufacturer's product in a pop-up retail venue or at a parking lot sale may receive the same caliber of personalized experience as a consumer purchasing the manufacturer's product in a high-end brick-and-mortar retail store or the manufacturer's own retail stores. This may be accomplished by leveraging consumer data maintained by the manufacturer and providing limited access to a specific portion of that data to its retail stores or a retail partner. Data security and privacy is also relevant to a consumer's experience, and to that end, the technology described herein gives the consumer control over the granting of access to his or her data.

For example, a consumer may visit a "store" operated by the manufacturer's retail partner (the term "store" refers to a wide variety of venues, including traditional brick-and-mortar stores, mall kiosks, pop-up venues, parking lot events, virtual stores in a virtual or augmented reality environment, and any other location in which a sale may occur). The consumer may wish to make a purchase similar to a previous purchase or a previously desired or contemplated purchase, such as the same model of shoe and/or the same preferred fit of shoe, but the consumer may not remember this information. Fortunately, the manufacturer, upon consumer consent, has this consumer's purchase history information, as well as previously desired or requested items (e.g., inclusion in online draws or lottery-like systems to obtain exclusive and/or high demand products). In order to provide an enhanced, personalized retail experience, all parties involved (e.g., the manufacturer, it's retail store employees, retail partners, and consumers) desire for the relevant purchase history information and other relevant product interest history to be shared with a retail partner and at least one of its employees so that the consumer can complete a transaction with confidence. However, the manufacturer may have certain information (e.g., financial data, sensitive or personal data that is not necessary for understanding the consumer's purchase history, or relevant data about other consumers) that should not necessarily be shared with all of its employees, or with a retail partner and its employees. Thus, the manufacturer needs granular control over the access that is granted, thereby also enabling the consumer to exercise control over whether and when access to the consumer's data is granted.

In order to accomplish these goals, a manufacturer computing system (or a computing system associated with another entity) may control data access by issuing (or authorizing the issuance of) "tokens" (e.g., digital credentials) to devices operated by trusted entities and individuals. For example, the manufacturer computing system may issue a token to a trusted retail partner computing system; such token may grant the trusted retail partner computing system access to a limited portion of the data stored at the manufacturer computing system. In turn, the trusted retail partner computing system may issue a token to a trusted employee device; such token may grant the employee device access to a subset of the data that is accessible to the trusted retail partner computing system. For example, if the trusted retail partner computing system can access consumer data and inventory data, the trusted retail partner computing system can only enable the employee device to access consumer data and/or inventory data (but not other types of data). The tokens may be subject to numerous conditions, including time- and location-based conditions. For example, the tokens may expire after a certain amount of time has elapsed or when a certain location-based requirement is not satisfied. This implementation ensures that the manufacturer maintains granular control over access to the data that it stores.

In order to give the consumer control over the consumer's data, an additional layer of security may be imposed by requiring the consumer to initiate and/or consent to the granting of access to the consumer's data. An exemplary way to accomplish this is to require the consumer to present a consumer identifier, such as a QR Code® generated by an app provided by the manufacturer, to the retail partner employee. The employee may scan the consumer identifier using the employee's device, and upon such consumer-agreed-upon scanning, the consumer identifier may be utilized as an indication that the consumer has consented to granting the employee's device access to the select consumer data. This configuration ensures that the retail partner employee and the consumer, as well as their respective devices, are within a certain degree of physical proximity to one another and that the consumer has initiated and consented to the employee accessing the consumer's data.

The retail partner employee device may therefore be granted access to a consumer's consented-as-shareable data based on the fact that the trusted retail partner computing system has an active digital token, the retail partner employee device has an active digital token, and the consumer has manifested consent through that multi-step process. Such a threshold number of active tokens involving consumer consent may be deemed a "quorum" that may be utilized to determine whether access is granted to this particular type of data. In this example, upon receiving access to the requested data, the employee may then help the consumer select a retail item, thus providing an enhanced, personalized experience for the consumer.

As will be discussed in more detail below, the context of a manufacturer and a retail partner is exemplary only, and many other contexts, whether or not related to a supply chain, are included within the scope hereof. Additionally, uses of this technology are not limited to retail environments. Additional or alternative exemplary uses include controlled, quorum-based access internally within an entity's computing system (e.g., access by a manufacturer's or retailer's employees), as well as in any other industry where controlled access to select private information is desired.

BRIEF DESCRIPTION OF THE DRAWINGS

Aspects of the technology described in the present application are described in detail below with reference to the attached drawing figures, wherein:

FIGS. 6A-D depict communication flow diagrams for controlling access to secure computing resources, in accordance with aspects of the technology described herein;

FIGS. 7-8 depict flow diagrams of methods for controlling access to a secure computing resource, in accordance with aspects of the technology described herein;

DETAILED DESCRIPTION

Figure 1:
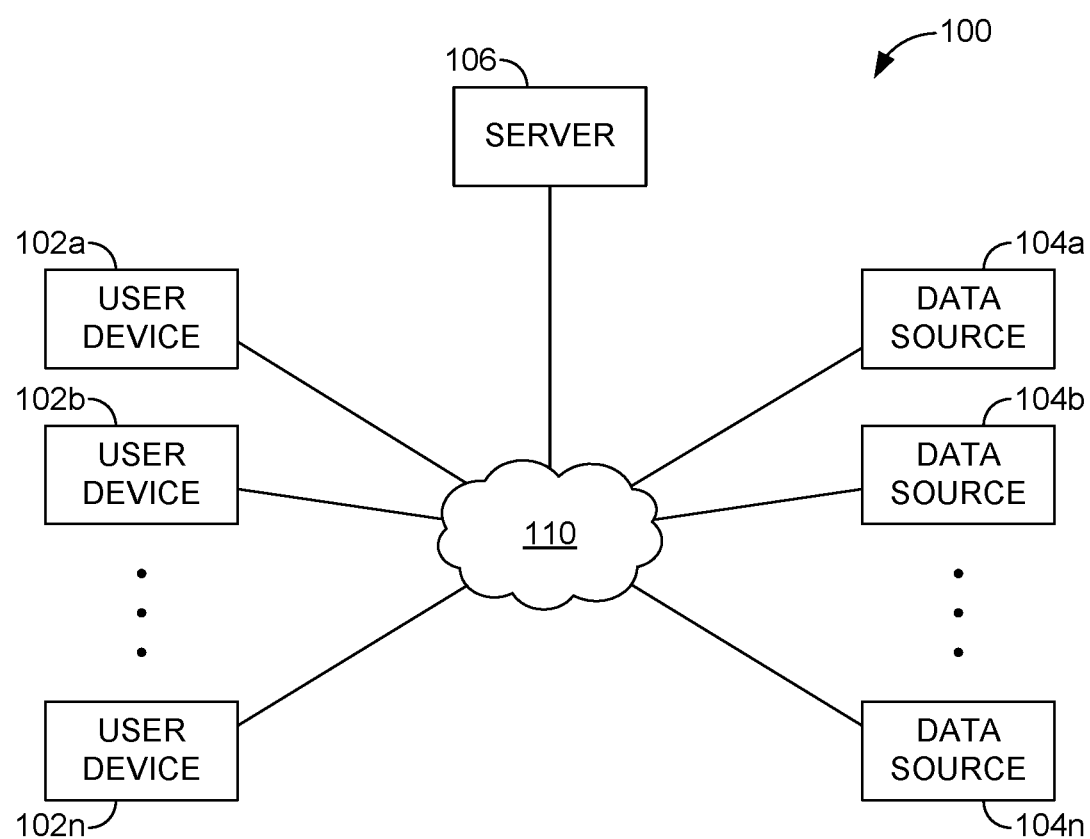
FIG. 1 is a block diagram of an exemplary computing environment suitable for implementing aspects of the technology described herein.

The technology of the present disclosure is described with specificity herein to meet statutory requirements. However, the description itself is not intended to limit the scope of this patent. Rather, the inventors have contemplated that the claimed subject matter might also be implemented in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides for controlling access to a secure computing resource, such as data about an individual person. For example, aspects hereof enable a manufacturer to leverage consumer data to provide a personalized retail experience for consumers of its products, while also maintaining the security of the data and protecting the privacy of its consumers.

The data maintained by a manufacturer (or other entity in a supply chain) may include purchase history information, preferred items or items of interest, or even preferred fit, such as the size and model of products tried on, returned, or purchased. The data stored by the manufacturer may include sensitive information, such as personally identifiable information and financial data. In some instances, it is beneficial to the consumer for a manufacturer to provide access to a portion of this data to other parties, such as a trusted retail partner and its employees. For example, if the consumer visits a retail store and cannot remember what shoe size and model the consumer previously preferred and/or purchased, the consumer benefits from the trusted retail partner having access to the consumer's information, because it can be utilized to provide a personalized retail experience for the consumer. However, the sharing of consumer data may raise concerns for various parties involved in this transaction. The consumer may be concerned about data being shared too liberally or falling into the wrong hands. Manufacturers are concerned about safeguarding consumer data while providing personalized service, while also requiring the same from their trusted retail partners. To address these concerns, the technology described herein provides the manufacturer (or other entity in a supply chain that stores consumer data) with granular control over access to the consumer data that it stores and also enables a consumer to initiate and/or consent to such access.

An authorizer component at a manufacturer computing system may control access to secure computing resources, which include a wide variety of information stored at the manufacturer computing system (e.g., consumer data, inventory data, personally identifiable information, sensitive data, and financial data). In some instances, the authorizer component may grant access when a "quorum" is satisfied. A quorum refers to a minimum number of individuals, computing systems, and/or computer software applications that have been validated by the authorizer component (or a delegate thereof). Such validation may be based, at least in part, on tokens (e.g., digital credentials) that are issued by the manufacturer computing system (or a delegate thereof). For example, the manufacturer computing system may provide a token to a retail partner computing system. Subsequently, a token may be issued to an employee device utilized by an employee of the retail partner. The token issued to the employee device may provide access rights that are less than or equal to the access rights provided by the token issued to the retail partner computing system. The tokens may be subject to a number of conditions, such as time- and location-based conditions. For example, the tokens may expire after a certain amount of time has elapsed or when a certain location-based requirement is not satisfied. In some instances, an active token at the retail partner computing system and at the employee device may be deemed a quorum that may be utilized to determine whether access is granted.

For certain types of data—namely, data pertaining to a particular consumer—an additional layer of security may be imposed by requiring the particular consumer whose data is to be accessed to initiate and/or consent to such access. An exemplary way to accomplish this is to require the consumer to provide a consumer identifier to a retail partner employee operating an employee device. The consumer identifier may take the form of a visual marking, such as a one-dimensional code (e.g., one-dimensional barcode), a two-dimensional code (e.g., Quick Response code or QR Code®, Data Matrix, two-dimensional barcode), or any other code or marking, as is discussed in more detail below. Such visual marking may be presented at a manufacturer's app on a consumer device, and the employee may scan the visual marking using the employee device. This configuration ensures that the employee and the consumer, as well as their respective devices, are within a certain degree of physical proximity to one another and that the consumer has initiated and/or consented to the employee accessing the consumer's data (the consumer's provision of the visual marking is a manifestation of that initiation/consent).

Accordingly, in an example, access may be granted based on the fact that a retail partner computing system has been issued a token (thus indicating a certain level of trust with the retail partner and its computing system), that an employee device has been issued a token (thus indicating a certain level of trust with the employee and the device), and that the consumer has provided a consumer identifier (thus indicating that the consumer is within a certain degree of physical proximity to the employee and that the consumer has affirmatively consented to the granting of access). In this example, a condition of access is a threshold number of validated or active tokens, as well as the consumer consent—this constitutes a quorum. Access may be granted by the authorizer component or by the retail partner computing system or by another computing system (e.g., acting as a delegate of the authorizer component).

Conventional solutions have numerous shortcomings. At one end of the spectrum, a manufacturer computing system (or a computing system associated with another supply chain entity) might permit access to consumer information in an effort to enhance the consumer shopping experience, but a conventional computing system lacks functionality for controlling and/or revoking data access at a granular level (e.g., a conventional computing system lacks the functionality for controlling the amount of data or the type of data that is made accessible to a third party). Additionally, the conventional systems lack functionality for enabling a consumer to exercise control over his or her own data. For example, conventional systems lack the functionality for conditioning a third party's access to consumer data on a consumer's consent to such sharing. These factors may jeopardize the security of the consumer data. At the other end of the spectrum, a manufacturer might safeguard consumer data by declining to share it with others, but in this instance, the consumer experience suffers. Conventional solutions fail to provide granular control over access to consumer data and therefore do not allow a manufacturer (or other supply chain entity) to securely delegate access to its partners, such as its retail partners.

Furthermore, conventional technologies for consumer-initiated data retrieval can involve a retail partner employee asking a consumer to provide some identifying information (e.g., name, email address, phone number). The consumer might provide the information verbally, in which case the employee enters it into a computing device and the consumer information is retrieved. The consumer might also type the information into a computing device in order to facilitate the retrieval of the information. In either instance, the process utilized by these technologies is flawed. For example, the input of identifying information is susceptible to human error by the employee and/or the consumer (e.g., typographical errors, misstating or misspelling the information). Additionally, when the information is provided, there is a risk that the information will be overheard (when the consumer provides the information verbally) or overseen (when either the consumer or the employee manually enters the information) by a bystander. Furthermore, this type of information can be discovered relatively easily and is thus potentially susceptible to fraud. All of this could compromise the consumer's privacy and the security of the consumer's data.

Yet another drawback of conventional solutions is that failures in a retail partner's devices or networks may lead to data loss and expose the manufacturer to risk. Conventional solutions involve a manufacturer computing system sharing consumer data and allowing retail partners to store such data on the retail partners' computing systems. This exposes the data to greater risk, because if any one of the retail partners' computing systems is compromised, the data shared by the manufacturer (which may include sensitive and/or personal information) may be made public. In other words, the security of the data depends on the security of each retail partner's computing system. A failure of any system puts the security of the data and consumers' privacy at risk, as well as potentially exposing the manufacturer to liability based on the manufacturer's uncontrolled sharing of the information.

Aspects of the technology described herein solve the problems described above by enabling a manufacturer (or other entity) to obtain the advantages of sharing data with third parties, while ensuring the security of such data and the privacy of individuals associated with the data. In particular, the technology described herein enables a manufacturer to granularly control access to the data it stores, as well as evaluate and grant or deny access in real time. For example, a manufacturer computing system can grant access only when the request for access satisfies a quorum specified for the data requested. The quorum may be tailored to different types of data and their relative degrees of sensitivity. Additionally, by implementing a token-based architecture, as described herein, the manufacturer computing system can implement tiers of access and further control or manage access by certain entities (e.g., time- or location-based conditions for access). Accordingly, the manufacturer computing system has granular control over multiple aspects of data access.

The technology described herein also puts individual consumers in control of their data by conditioning access to certain data on the consent of the individuals associated with such data. For example, if an employee provides physical evidence of a consumer's consent to the data retrieval, it is ensured that the employee and the consumer, as well as their respective devices, are within a certain degree of physical proximity to one another and that the consumer has initiated and/or consented to the employee accessing the consumer's data. The technology described herein also reduces the risk of error and fraud, to which conventional solutions are prone. For example, if a consumer must present a visual marking (or other form of consumer identifier) generated by a manufacturer's application on the consumer's device, then the consumer may be authenticated by the manufacturer beforehand, thus reducing the risk of another individual impersonating the consumer to gain access to the consumer's information. Additionally, by presenting a visual marking (or other form of consumer identifier) on the consumer's device, rather than manually keying information or speaking information aloud, the risk of human error and/or eavesdropping is alleviated. Accordingly, the security and privacy of the consumer is enhanced, and the consumer is put in control of his data.

Furthermore, some aspects of the technology described herein grant access to data, rather than sharing the data, itself. This mitigates the risk associated with allowing third parties to store data on their own computing systems. The number of potential points of failure is reduced, and a breach of a retail partner computing system does not necessarily compromise the data that originates from the manufacturer. The numerous improvements to computer security and controlled data access provided by the technology described herein may satisfy or exceed requirements imposed by privacy laws and regulations.

Having briefly described an overview of aspects of the technology described herein, an example operating environment suitable for use in implementing the technology is now described. With reference to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. It should be understood that operating environment 100 shown in FIG. 1 is an example of one suitable operating environment. Each of the components shown in FIG. 1 may be implemented via any type of computing device, such as computing device 1000 described in connection to FIG. 10, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n may be client devices on the client-side of operating environment 100, while server 106 may be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 10 herein. By way of example and not limitation, a user device may be implemented as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIGS. 2A-B. (For example, in one aspect, one or more data sources 104a through 104n provide (or make available for accessing) the consumer data that is stored by a manufacturer.) Data sources 104a and 104b through 104n may be discrete from user devices 102a and 102b through 102n and server 106 or may be incorporated and/or integrated into at least one of those components. In one aspect, one or more of data sources 104a through 104n comprise one or more sensors, which may be integrated into or associated with one or more of the user device(s) 102a, 102b, or 102n or server 106.

Figure 2A:
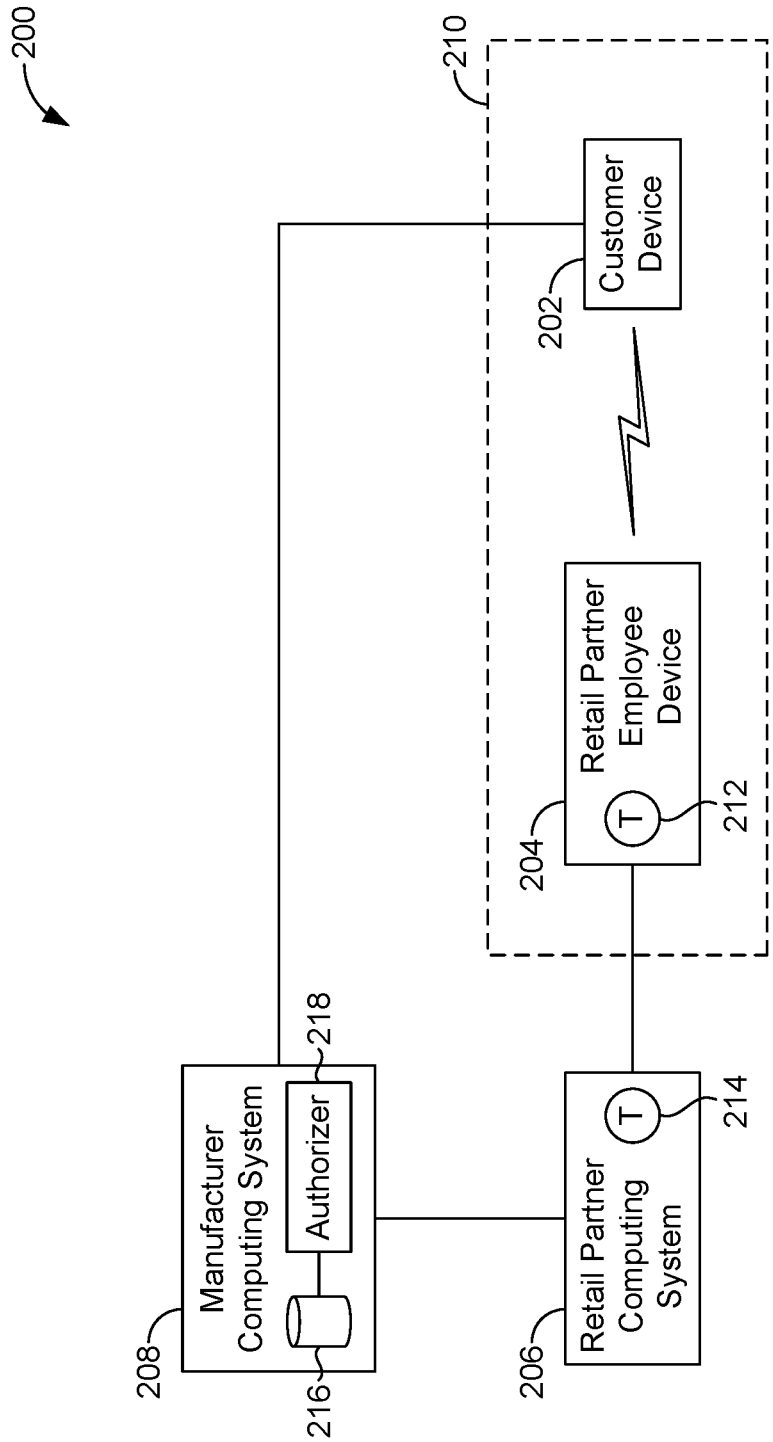
FIGS. 2A-B are diagrams depicting exemplary computing architectures suitable for implementing aspects of the technology described herein.
Figure 2B:
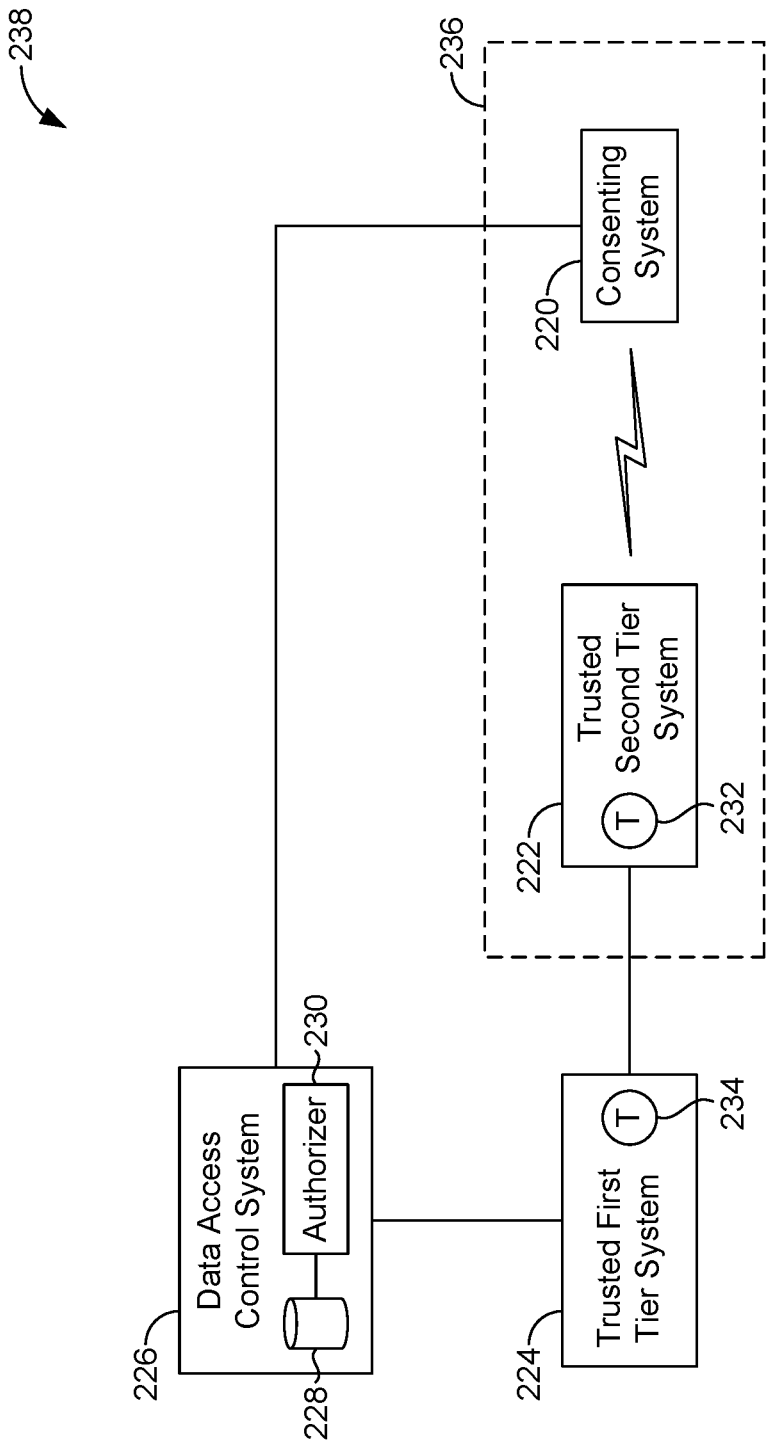

Operating environment 100 can be utilized to implement one or more of the components of system 200, described in FIG. 2A, including components associated with the customer device 202, retail partner employee device 204, retail partner computing system 206, and manufacturer computing system 208, as well as one or more of the components of system 238, described in FIG. 2B, including components associated with the consenting system 220, trusted second tier system 222, trusted first tier system 224, and data access control system 226. Referring now to FIGS. 2A-B, with FIG. 1, block diagrams are provided showing aspects of exemplary computing system architectures suitable for implementing aspects hereof and designated generally as systems 200 and 238, respectively. Systems 200 and 238 represent only examples of suitable computing system architectures. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Beginning with FIG. 2A, example system 200 includes a customer device 202, a retail partner employee device 204, a retail partner computing system 206, and a manufacturer computing system 208, each of which may be implemented via any type or number of computing devices, such as computing device 1000 described in connection with FIG. 10, or user devices 102a through 102n or server 106 described in connection with FIG. 1. For example, customer device 202 and retail partner employee device 204 may each correspond to one or more of user devices 102a through 102n. Retail partner computing system 206 may correspond to one or more of user device 102a through 102n or server 106. Manufacturer computing system 208 may correspond to one or more servers, such as server 106. In some instances, the retail partner computing system 206 may be part of the same computing system as manufacturer computing system 208 and/or part of the same computing system as retail partner employee device 204. In other words, as described with respect to FIG. 1, each component depicted in FIG. 2A may comprise a single device or multiple devices cooperating in a distributed environment. Each of customer device 202, retail partner employee device 204, retail partner computing system 206, and manufacturer computing system 208 may include running thereon one or more computing software applications or apps that facilitate performance of the operations described herein in connection with these devices. The components depicted in FIG. 2A are communicatively coupled via one or more networks, such as network 110 described with respect to FIG. 1. For example, the components may be coupled via the Internet, a cellular or wireless communications network, a private network, a virtual private network (VPN), a virtual private cloud (VPC) network, any other network, or any combination of the foregoing. Furthermore, although the lines in FIG. 2A indicate that certain components are communicatively coupled to one another, it is understood that these lines are non-limiting. For example, the retail partner employee device 204 may be communicatively coupled with the manufacturer computing system 208.

Continuing with the example introduced above, suppose that manufacturer computing system 208 is associated with a manufacturer of shoes. The manufacturer computing system 208 stores customer data for the customer associated with customer device 202 (the terms "customer" and "consumer" are used interchangeably herein) at storage component 216. For example, the storage component 216 may store the preferred fit and model of shoes previously tried on and/or purchased and the dates on which such events occurred. The storage component 216 may store data about returns made by the customer (providing helpful insight into what items did not work for the customer), previously desired or requested items (e.g., if the consumer previously entered an online draw or lottery-like system for a particular product that is in high demand), as well as other data about the customer and the customer's utilization of various products and services. The storage component 216 may store personally identifiable information (e.g., tying the customer's identity to the data) and financial data, as well as sensitive data. The type of customer data that is stored at storage component 216 may be based on customer-defined preferences regarding data collection and storage. Due to the nature of the information stored at storage component 216, an authorizer component 218 (sometimes referred to herein simply as "authorizer") controls access to the information, as will be explained in more detail below.

The customer may visit a retail partner store that sells the manufacturer's product. The retail partner store may be affiliated with the manufacturer (e.g., the manufacturer may have its own retail stores) or may be operated by an entity that is independent and distinct from the manufacturer. As used herein, the phrase "retail partner store" refers to a wide variety of venues, including traditional brick-and-mortar stores, mall kiosks, pop-up venues, parking lot events, virtual stores in a virtual or augmented reality environment, and any other location in which a sale may occur. The retail partner store may utilize retail partner computing system 206. An employee utilizing retail partner employee device 204 may be working at the store. Because the customer and the employee, as well as their respective devices, are in the same store/venue, they are in physical proximity to one another, as indicated by the proximity boundary 210.

The customer may wish to make a purchase similar to a previous purchase or product of interest, such as the same model of shoe and/or the same preferred fit of shoe, but the customer may not remember this information. The manufacturer has the customer's purchase history information, preferred items or items of interest, preferred fit, as well as other data stored at storage component 216 of manufacturer computing system 208. In order to enhance the customer's shopping experience, all parties involved (e.g., the manufacturer, retail partner, employee, and customer) desire for the relevant purchase history information to be shared with the retail partner. However, the storage component 216 stores data in addition to the relevant purchase history information that should not necessarily be shared with the retail partner or its employees (e.g., financial data, sensitive or personal data that is not necessary for understanding the customer's purchase history). Thus, the parties do not desire for the manufacturer to grant complete access to the information stored at storage component 216. Instead, the manufacturer needs granular control over the access that is granted. Additionally, before granting access to certain types of data, it may be beneficial to allow the customer to initialize and/or consent to the granting of access in order to provide the customer with control over his data.

The authorizer 218 is generally responsible for determining or controlling access to the information stored at storage component 216. The authorizer 218 may control a level of access granted to a particular third party and/or may impose certain parameters or conditions on such access. The authorizer 218 may implement its access control functions via managing or issuing digital credentials, or "tokens," as will now be described in more detail.

The storage component 216 at manufacturer computing system 208 stores a variety of information. For example, storage component 216 may store (1) purchase history and product interest data for customers, (2) inventory data across the manufacturer's supply chain, and (3) financial data for customers. These categories of information are exemplary only, and it is understood that storage component 216 may store many other types of information. Each item of information is considered a secure computing resource that is subject to the manufacturer's conditional access policy, implemented by authorizer 218. The manufacturer desires to grant its retail partner access to a subset of the information stored at storage component 216. For example, the manufacturer desires to grant access only to (1) customer purchase history and product interest data and (2) inventory data, but not (3) customer financial data. To accomplish this, the authorizer 218 may grant a digital credential—e.g., token 214—to the retail partner computing system 206. The token 214 limits the retail partner's access to only data in categories (1) and (2), but not data in category (3).

In order to utilize this data for the benefit of customers, such as the customer needing assistance with determining a model and preferred fit of shoe, it may be desirable to share access to the purchase history and product interest data with one or more of retail partner employees. To accomplish this, a digital credential—e.g., token 212—is granted to the retail partner employee device 204. The token 212 may be granted to the employee device 204 by the authorizer 218. Additionally or alternatively, the authorizer 218 may delegate this function to another component, either within or outside of the manufacturer computing system 208. For example, the authorizer 218 may enable the retail partner computing system 206 to grant token 212 to employee device 204 based on the fact that the retail partner computing system 206 has been granted token 214.

The token 212 granted to the employee device 204 enables access that is equal to or less than the access enabled by the token 214 granted to the retail partner computing system 206. In other words, the access enabled by token 212 is a subset of the access enabled by token 214. For example, if token 214 enables access to categories (1) and (2), then token 212 may enable access to category (1), category (2), or both categories (1) and (2), but it may not enable access to any other categories. The access rights provided by token 212 may not exceed those provided by token 214. In this sense, token 214 may be thought of as a "parent token," and token 212 may be thought of as a "child token."

Additionally, each token may be subject to a number of conditions, such as time-and location-based conditions. For example, the tokens may expire at a designated time and/or after a period of time has elapsed. For token 212, this may be the time that shifts typically change and/or after a period of time corresponding to the duration of a typical working shift. Tokens may also be set to expire after a session initiated by the token has been idle for a threshold period of time. Tokens may also be set to expire after a certain period of time has elapsed since the time the token was first used to obtain data access. As another example, tokens may grant data access only when the associated computing system is at a particular location (e.g., for token 212, when employee device 204 is in the retail partner store). When a token expires, a new token may need to be obtained in order to gain access to the data at the storage component 216. For example, when token 212 expires, the employee may be required to re-authenticate in order to have a new token provided to the employee device 204. The conditions imposed on the tokens 212 and 214 provide an additional layer of protection for the data stored at manufacturer computing system 208, because they mitigate the risk of a retail partner or an individual employee compromising the data, whether through intentional misuse or through inadvertent neglect. This additional layer of protection is beneficial, because the manufacturer's supply chain may include dozens of retail partners, each of which has hundreds of stores and that cumulatively employ tens of thousands of employees.

The term "token" is used broadly herein. It may refer to any digital credential and is not intended to be limiting. The tokens may provide a mechanism to open a secure communication session among computing devices and to impose conditions on that session. For example, the provision of token 212 to employee device 204 may constitute the start of a secure communication session among any number of devices, such as between the employee device 204 and the retail partner computing system 206 and/or the manufacturer computing system 208.

In addition to time- and location-based conditions, the parameters or conditions around data access may include requiring an indication of approval by an additional party, such as a customer whose data is to be retrieved and/or an individual in a supervisory or managerial position. For example, in order for the employee device 204 to access customer data, an additional layer of security may be imposed by requiring the particular customer whose data is to be accessed to initiate and/or consent to such access. An exemplary way to accomplish this is to require the customer to provide a customer identifier (e.g., a code) to the employee operating employee device 204.

Accordingly, continuing with the above example, when the customer asks the employee for assistance in determining what shoe model and preferred fit the customer previously ordered or in which the customer previously expressed interest, the customer may provide the customer's identifier in order to authorize the retrieval of the customer's data (the customer may provide this information proactively, or the employee may ask the customer to provide the customer's identifier). An exemplary customer identifier is a visual marking that is presented via the customer device 202 and that can be optically scanned by the employee device 204 and used to determine the customer's identity. This configuration ensures that the employee and the customer, as well as their respective devices, are within a certain degree of physical proximity to one another, as indicated by the proximity boundary 210 in FIG. 2A, and that the customer has initiated and/or consented to the employee accessing the customer's data (the customer's provision of the visual marking is a manifestation of that initiation/consent).

In order to provide a customer identifier, the customer device 202 may include running thereon a computing application or service, such as an app, which may be communicatively linked with the manufacturer computing system 208. The app may be developed, released, and/or managed by the manufacturer. Once the customer has been authenticated (e.g., logged into the manufacturer's app or otherwise authorized by the manufacturer computing system 208 and/or retail partner computing system 206), the customer may use the app to provide his customer identifier to the employee device 204. The customer identifier may take a wide variety of forms. The customer identifier may identify the customer, or it may be a data pointer that points to information that identifies the customer (e.g., a code or key that is used to look up or access identifying information in a database that correlates codes with identifying information for customers). For example, if an encoded visual marking (e.g., two-dimensional code) is the customer identifier, the visual marking may encode information that identifies the customer, or it may encode a pointer that is used to retrieve identifying information. Regardless, the customer identifier may be unique to the customer. If the customer identifier is a pointer, the retrieval of the identifying information may be performed by any number of components. For example, the employee device 204 may have access to a database that is used to determine the identifying information. Additionally or alternatively, the employee device 204 may provide the pointer to the retail partner computing system 206 and/or the manufacturer computing system 208, which can then determine the identifying information. In this instance, the identifying information may be sent back to the employee device 204 and may be accompanied by the desired customer data.

The customer identifier may be any piece of information that may be used to identify the customer, such as a PIN, a one-dimensional code, a two-dimensional code, customer account information, a randomly generated number (e.g., a number generated by the manufacturer computing system 208 and associated with the customer in the manufacturer's database), a hash, a code, biometric data, or any other item. The customer identifier may be communicated to the employee device 204 by any means available, including near-field communication, Bluetooth®, visual communication (e.g., scanning a two-dimensional code utilizing a sensor of the employee device 204), audible communication (e.g., voice recognition utilizing a sensor of the employee device 204), biometric recognition (e.g., facial recognition or thumbprint recognition utilizing a sensor of the employee device 204), or any other means. In the instance of biometric recognition, a customer may be required to opt in before this functionality is enabled. The manner of communication may define the proximity boundary 210. For example, if the customer identifier is communicated via NFC, then the customer device 202 and the employee device 204 must be in very close proximity to one another (e.g., a few inches). Similarly, if the customer identifier is communicated by the employee device 204 scanning a display of the customer device 202, then the devices must be in very close proximity (e.g., a few inches). If the customer identifier is communicated via Bluetooth®, then the devices may be farther apart, but the range is still limited.

The customer identifier may be permanent or time limited. For example, the customer identifier may remain the same for an indefinite period of time, regardless of how often it is used. Additionally or alternatively, a new customer identifier may be generated for the customer based on a variety of conditions. For example, a customer identifier may expire after it has been utilized to retrieve the customer's data, after a predetermined period of time, after a certain number of uses, or any number of other factors.

As another example, the customer's consent to the data retrieval may be provided in the form of a response to a push notification. For example, the manufacturer computing system 208 and/or the retail partner computing system 206 may send a push notification to the customer, requesting authorization to release certain data. The customer may respond to the push notification at customer device 202 in order to authorize the release.

Returning now to the exemplary scenario of the customer needing assistance in determining a previous shoe model and preferred fit, once the employee device 204 has received the customer identifier, the employee device 204 may request the customer data. Access to such data may be granted based on the fact that the retail partner computing system 206 has been issued a token 214 (thus indicating a certain level of trust with the retail partner and its computing system 206), that the employee device 204 has been issued a token (thus indicating a certain level of trust with the employee and the employee device 204), and that the customer has provided a customer identifier (thus indicating that the customer is within a certain degree of physical proximity to the employee and that the customer has affirmatively consented to the granting of access). In this example, a condition of access is a threshold number of validated or active tokens associated with the devices included in the architecture of FIG. 2A, as well as customer consent (e.g., a "quorum"). Access may be granted by the authorizer 218, by the retail partner computing system 206, or by another component (e.g., acting as a delegate of the authorizer 218). Additionally or alternatively, the authorizer 218 may provide a control signal to a data controller that is associated with storage component 216 to grant or manage access to the data stored therein. The authorizer 218 may be responsible for token authentication, customer authentication, and the granting of access, but one or more of these functions may be delegated to another component, such as retail partner computing system 206. When the employee device 204 has been granted access, the employee device 204 may receive the desired customer data and use it to aid the customer in making a purchase.

It is understood that the preceding scenario is exemplary only and that other scenarios are included within the scope hereof. For example, the token 212 that is issued to the employee device 204 may be utilized to generate an output, such as a visual marking that is displayed on the employee device 204, printed and/or digitally written on an employee badge, or otherwise output for presentation. In order to obtain access to customer data stored at storage component 216, the employee may input the customer identifier (e.g., scan a visual marking presented on the customer device 202), input the output generated based on token 212 (e.g., scan the employee's own visual marking), and then submit the request for access to the customer data. Such scanning may be performed by the employee device 204 or by another device associated with the retail partner. Similar to the previous example, if both the employee's visual marking and the customer's visual marking are validated, meaning that any conditions pertaining to time, location, or other factors are satisfied, then this may be deemed to constitute a quorum and the employee may be granted access to the customer's data.

The term "quorum" may be used to refer to the number and/or type of devices, software applications, and/or individuals that must be validated before access will be granted. For example, a trusted employee (e.g., an employee who has been authenticated and issued a token) of a trusted retail partner (e.g., a partner who has been issued a token) using a trusted application on a trusted employee device (e.g., an application on a device that has mobile device management software and is registered with the retail partner and/or manufacturer) at a particular location (e.g., store location) may constitute a quorum in some instances. In other instances, additional individuals (e.g., customer, retail partner supervisor) must be validated to constitute a quorum. In yet other instances, only a portion of the aforementioned items may be needed to constitute a quorum, or additional or alternative items may be needed to constitute a quorum. The manufacturer may use the concept of a quorum to evaluate data requests on an individual basis by validating all identities the manufacturer deems necessary and approving only those that satisfy the quorum. For example, the token at the retail partner computing system and the retail partner employee device (as well as the manifestation of customer consent, where applicable) may be validated by the manufacturer with each data request. This allows the manufacturer to log and audit all retail partners and retail partner employees (and associated devices and applications), as well as customer data requests (including validations of tokens and attempts to validate tokens). The application of the conditional access policy may be done in real time in order to allow or deny access requests and to guide the collection of additional information, as needed (e.g., guide an employee to collect a customer identifier). Additionally or alternatively, the retail partner computing system 206 may act as a delegate of the manufacturer computing system 208 and perform at least a portion of the functionality associated with evaluating data requests.

It is understood that the context of a manufacturer and retail partner, as well as their respective computing systems, that is discussed above with respect to FIG. 2A is exemplary only. Additionally, the lines between various entities in a supply chain are not always clearly defined, and there may be overlap among various roles. For example, a single entity may perform manufacturing functions, transportation functions, retail functions, as well as many others. Additionally or alternatively, a single entity may partner with other entities to perform some or all of those functions. Accordingly, the technology described herein may be implemented in a wide range of contexts, as reflected by the exemplary architecture depicted in FIG. 2B.

The functionality provided by the components depicted in FIG. 2B may be analogous to the functionality provided by the components depicted in FIG. 2A. For example, the data access control system 226 and its storage component 228 and authorizer 230 may provide functionality similar to that described with respect to the manufacturer computing system 208 and its storage component 216 and authorizer 218; the trusted first tier system 224 may provide functionality similar to that described with respect to the retail partner computing system 206; the trusted second tier system 222 may provide functionality similar to that described with respect to the retail partner employee device 204; and the consenting system 220 may provide functionality similar to that described with respect to the customer device 202. Similarly, tokens 232 and 234 may operate in a manner similar to that described with respect to tokens 212 and 214, and the proximity boundary 236 may be similar to proximity boundary 210. Accordingly, the discussion regarding the system and components of FIG. 2A may apply to the system and components of FIG. 2B, as well.

The components depicted in FIG. 2B may be associated with the same entities discussed above with respect to FIG. 2A; additionally or alternatively, the components depicted in FIG. 2B may be associated a wide variety of other entities, whether or not related to a supply chain. For example, the data access control system 226 may be a corporate retail system (e.g., a back-end system operated by a corporate retail entity). The trusted first tier system 224 may be a trusted retailer system (e.g., a system operated by a store affiliated with the corporate retail entity), and the trusted second tier system 222 may be operated by an employee at the trusted retailer. The consenting system 220 may be a mobile device operated by a customer who is visiting the trusted retailer. In this example, a retailer may store and control access to a consumer's information, as was discussed with respect to a manufacturer in FIG. 2A.

The components in FIG. 2B may be utilized to implement quorum-controlled access to a secure computing resource in any number of other contexts. For example, in a healthcare context, the data access control system 226 may store aggregated healthcare data about patients. A patient may utilize consenting system 220 to authorize the data access control system 226 to allow a doctor's office to access a specific subset of the patient's data. The data access control system 226 may permit a trusted first tier system 224 associated with the doctor's office to access the data, and the trusted first tier system 224 may, in turn, permit a trusted second tier system 222 operated by one of its doctors or nurses to access the data. Additional examples in the personal training context are described elsewhere below.

For ease of discussion, the remaining figures are described in the context of the architecture depicted in FIG. 2A, but it will be understood that the features discussed may also be applied in the context of the architecture depicted in FIG. 2B with respect to the analogous components shown therein.

As illustrated by the examples above, various scenarios may require the authentication or validation of a retail partner, a retail partner employee, a customer, and/or their respective devices and device software in order to achieve a quorum. Exemplary aspects of each of these actors and/or their devices will now be described with reference to FIGS. 3-4B, where the components may be similar to similarly-named components discussed above in conjunction with earlier figures.

Figure 3:
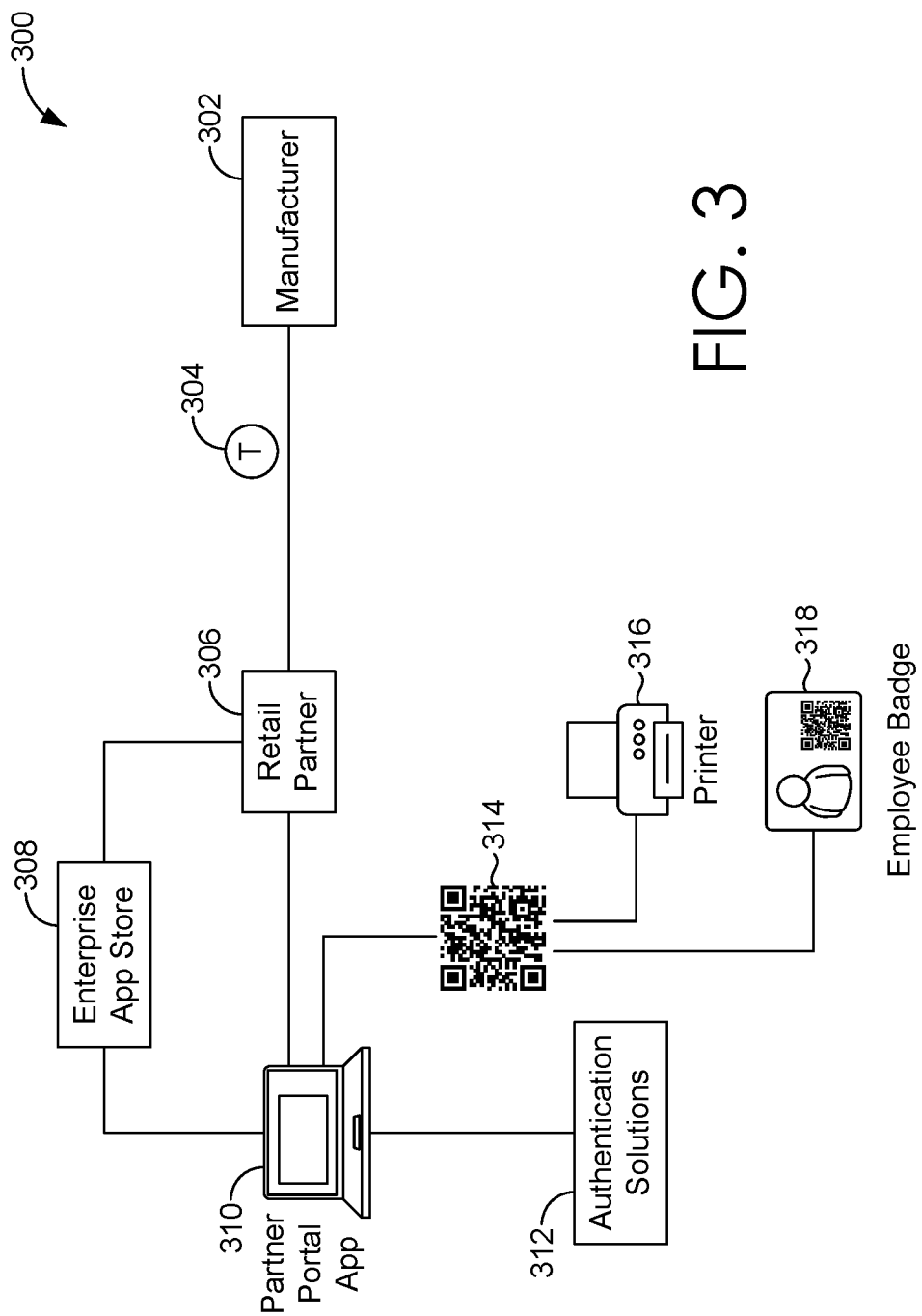
FIGS. 3-4B are diagrams depicting exemplary computing architectures suitable for implementing aspects of the technology described herein.

First, exemplary aspects of the retail partner and associated devices will be described with reference to the exemplary architecture 300 in FIG. 3. The manufacturer 302 may provide an enterprise application ("partner application" or "partner portal application") that serves as the link between the partner 306 and the manufacturer 302. The partner application may be available via an application store 308 and may initially require a token 304 from the manufacturer 302 in order to register with the manufacturer 302. The token 304 may be input into the partner enterprise application at partner computing system 310. This token 304 may uniquely identify the retail partner 306 and the instance of the partner application. The partner application (potentially in combination with other authentication solutions 312, such as federated identity technology) may act as a delegate of the manufacturer 302 in order to authenticate retail partner employees and their devices and then issue tokens to enable the employees to access data stored at the manufacturer 302.

The token issued to an employee device may be used to generate an output, such as a visual marking 314 that can be printed at printer 316 and/or digitally written to an employee's name badge 318 (while QR Code® visual markings are depicted in the figures for illustration purposes, it is contemplated that any generated output may be utilized in connection with the examples provided by the figures, including the numerous examples of visual markings, codes or other identifiers discussed herein). The employee badge is discussed in more detail with respect to FIG. 4B below.

The partner application may also facilitate the provisioning of mobile devices for retail partner employees. For example, the partner application may need to issue a token for each installation of a retail partner employee device application. The partner application may be associated with multiple credentials, such as a partner username/password, PIN, and/or a partner token, which may be validated by the manufacturer 302. The manufacturer 302 may retain control over the retail partner's access to data at storage component 216 by authenticating the retail partner computing system (including its partner token) in order to initiate a connection and/or by revoking the partner token to revoke access. In an example, the token may only function with the partner application on registered and managed partner devices. The partner application may also offer inventory management benefits. For example, the partner application may allow a retail partner to maintain the partner's local inventory, gain access to online inventory, and other retail-related activities.

Figure 4A:
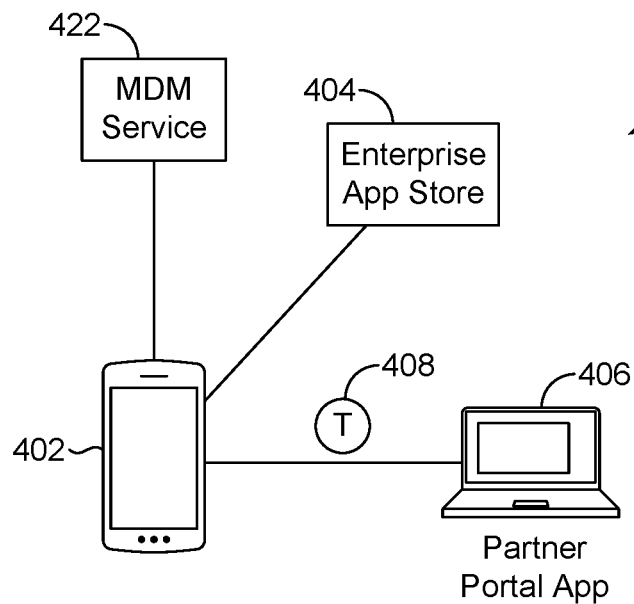

Turning now to the partner employee, the exemplary architecture 400 in FIG. 4A shows an exemplary process for loading the partner employee app onto a device. A device 402 is enrolled in a mobile device management (MDM) service 422, such as an MDM that is a service specified by the manufacturer and/or that complies with certain requirements of the manufacturer. The device may be provided by the retail partner but may be subject to certain requirements of the manufacturer (e.g., is not jailbroken; satisfies minimum operating system and patch requirements; satisfies minimum hardware requirements, such as encryption abilities; satisfies PIN standards, such as a 6-digit PIN (the PIN may be shared by multiple employees, because the employee device may be shared by multiple employees); and is compatible with approved MDM software). A retail partner employee device application is downloaded from an application store 404 and installed on the device 402. The device 402 and the application are registered with a retail partner application at a retail partner computing system 406. The retail partner computing system 406 issues a token 408 to the device 402 (as previously described, a token may be issued to the employee device by the manufacturer or by the retail partner, acting as the manufacturer's delegate). The partner employee device 402 application may now enable conditional access to data stored at the manufacturer. This architecture provides multiple layers of security. First, the employee may have username and password credentials that are used by the retail partner and/or the manufacturer to authenticate the employee. For example, such credentials may be used to log into the partner employee device application. In some instances, credentials for the employee may be encoded in an employee badge that is equipped with NFC technology to facilitate communication of the credentials from the badge to a computing device, such as the partner employee device 402. For example, a token containing the employee credentials may be provided as an NFC output. Multi-factor authentication may be performed based on (1) the employee using a computing device, such as the partner employee device 402, to scan the NFC badge encoded with credentials and (2) the employee entering a PIN, such as a time-limited PIN, into the computing device. Other factors may be used instead of, or in addition to, these exemplary factors for authentication. This structure provides convenience, because it eliminates the need for the employee to manually enter a username and password every time the employee logs into a new device, and it also enhances security. As another layer of security, the token 408 provided to the partner employee device 402 may uniquely identify the retail partner employee and establish the retail partner employee's identity. And as previously described, the token may be subject to numerous conditions. For example, the token may open a secure communication session among devices, and the duration of that session may be controlled through TTL parameters. A token may also be issued for the employee device application (e.g., one token for each application registration). The partner employee device application may provide the added benefit of tracking usage of the application and communications initiated through the application at the level of an individual employee. All retail partners, retail partner employees, and retail partner employee device application instances may be cryptographically identified and validated before granting a particular request for data access.

Figure 4B:
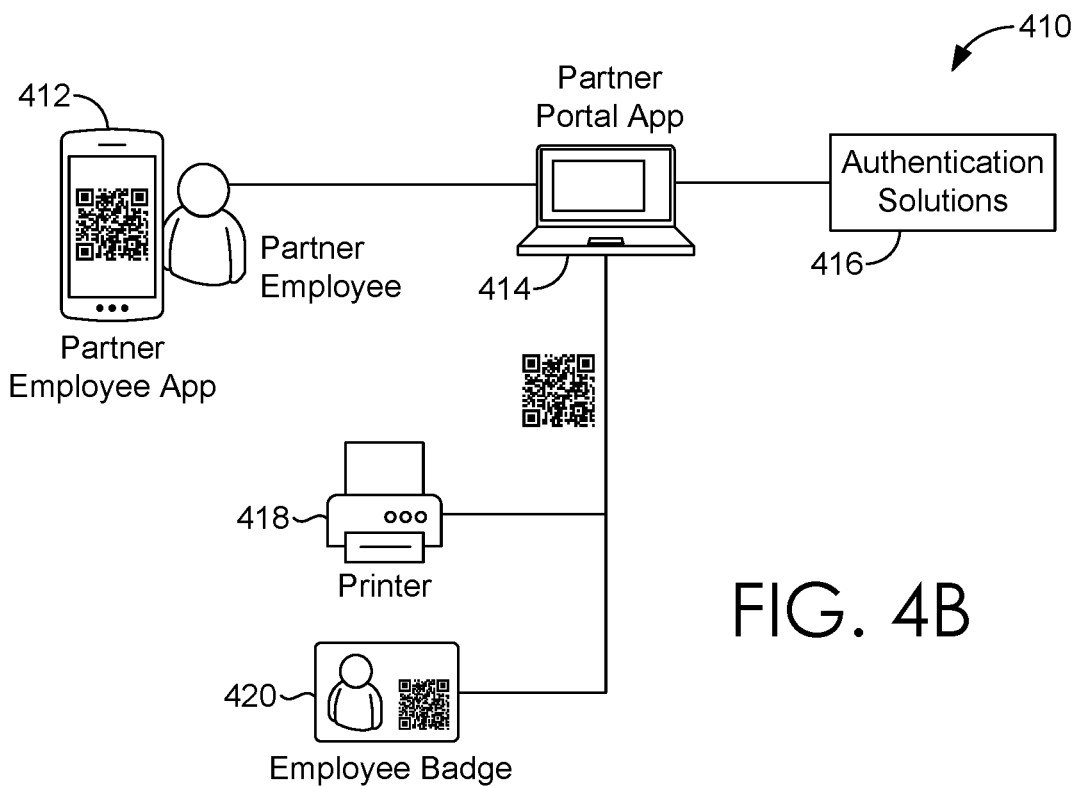
Figure 5A:
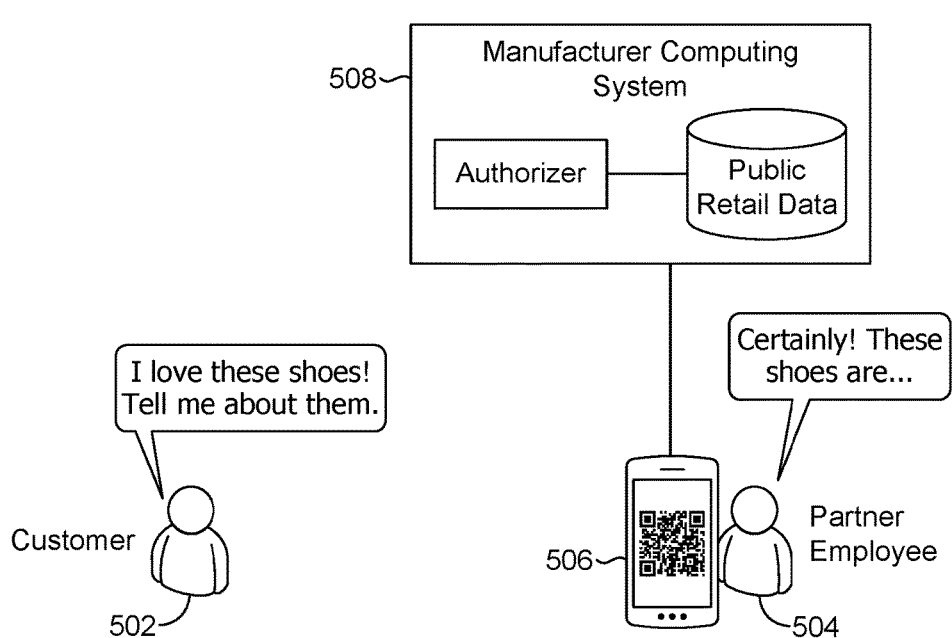
FIGS. 5A-D illustrate a series of exemplary interactions in a retail context, in accordance with aspects of the technology described herein.
Figure 5B:
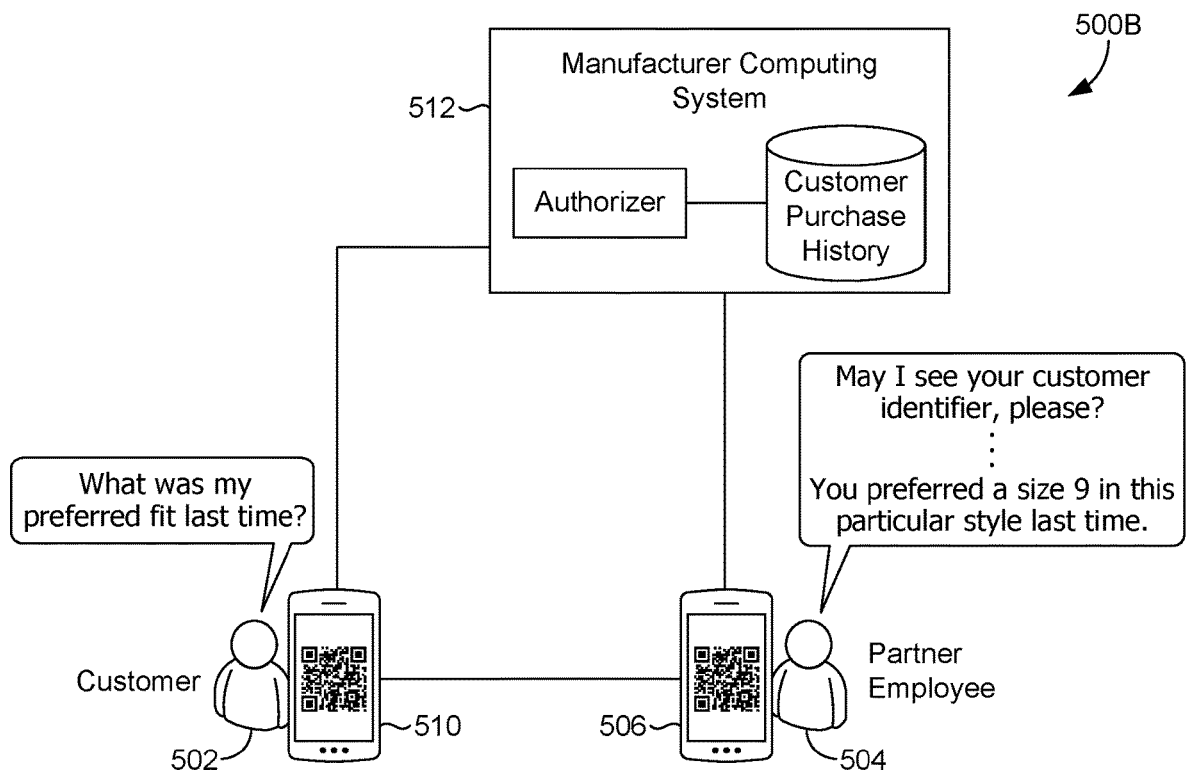
Figure 5C:
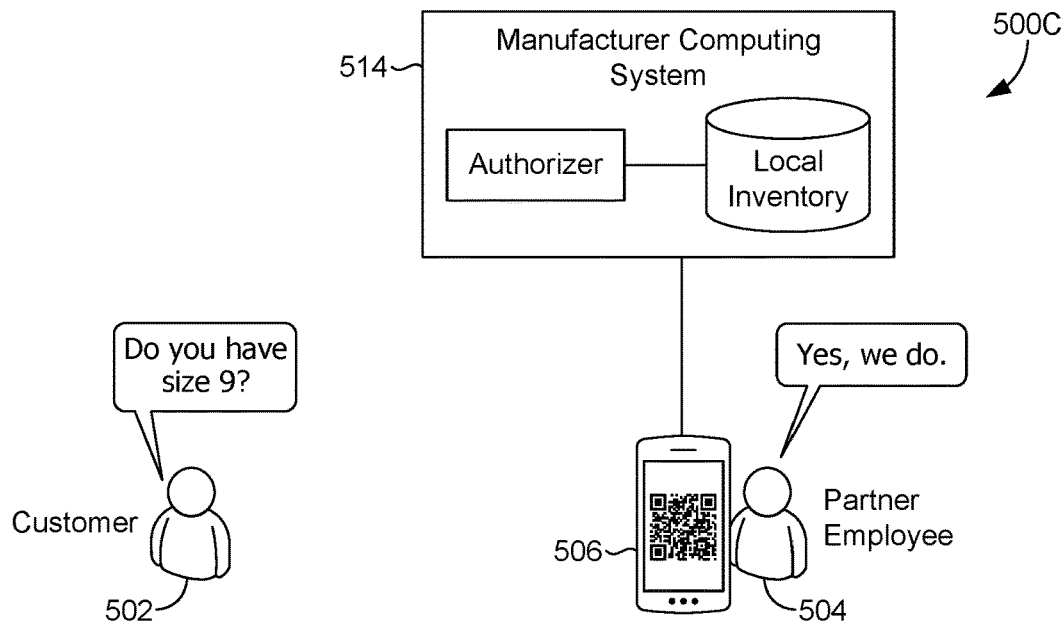
Figure 5D:
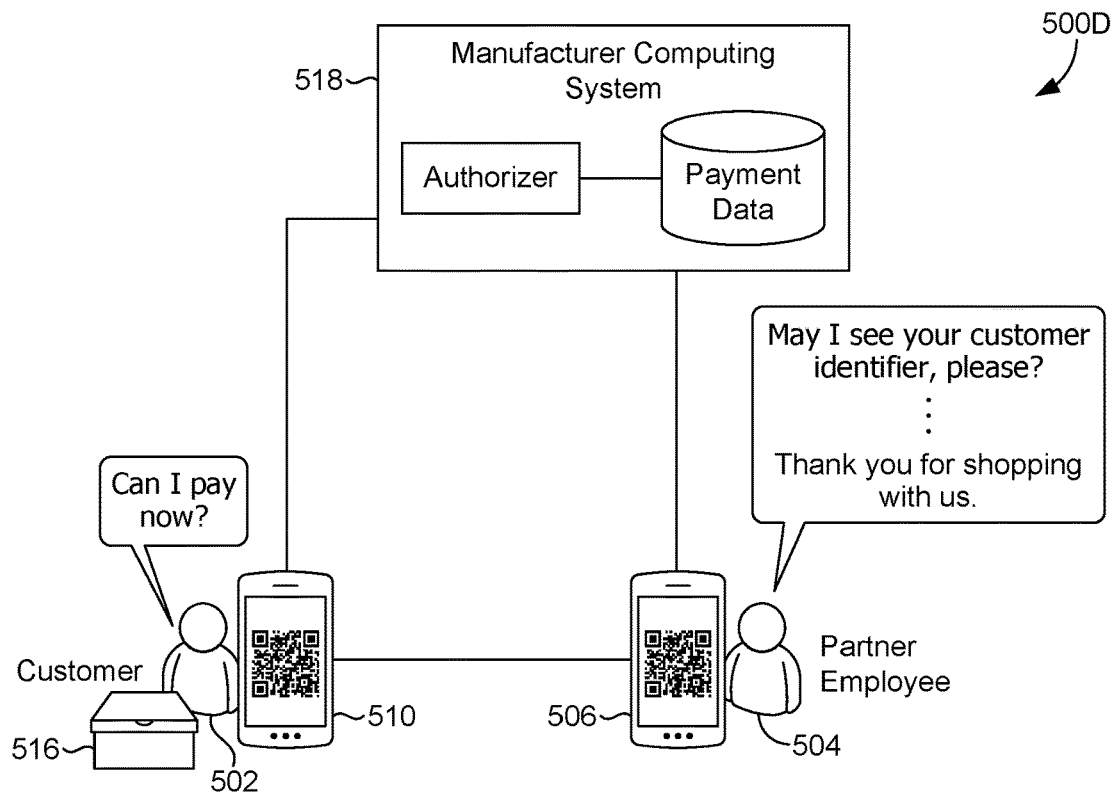

Turning now to FIG. 4B, an exemplary architecture 410 for utilizing a token to generate an output, such as a visual marking that can be printed at a printer and/or digitally written to an employee's name badge, is illustrated. A partner employee utilizes partner employee device 412 to provide credentials (e.g., username and password) to be validated by the retail partner computing system 414 (potentially in combination with other authentication solutions 416, such as federated identity technology). Additionally or alternatively, the partner employee may provide credentials directly to the retail partner computing system 414.

As mentioned above, authentication may also be performed based on a partner employee badge that is encoded with the partner employee's credentials and that is equipped with NFC technology to facilitate communication of the credentials from the badge to a computing device, such as the partner employee computing device 412. In this way, multi-factor authentication may be performed based on credentials received from an NFC-equipped badge and a PIN, such as a time-limited PIN, or any number of other authentication factors. In some implementations, a PIN (or a second authentication factor), used in conjunction with credentials provided by the NFC-equipped badge, may be needed only once within a time interval (e.g., once per hour), once per session, or once within an employee shift. As such, following an initial login using multi-factor authentication from the PIN and NFC-equipped badge, authentication subsequently determined during the time interval, session, or shift may be determined only by reading the NFC-equipped badge. Thus, a partner employee is not required to provide both a PIN (or another authentication factor) and the credentials via the NFC-equipped badge if, for instance, they get logged out or switch devices during the time interval, session, or shift. Rather, the NFC-equipped badge alone (supplying the credentials when read) may be used to authenticate the partner employee. In some implementations, after a period of inactivity of the device and/or if the employee is logged off of the retail partner employee device application (which may happen after a period of inactivity, by closing the application, or manually logging off, for instance), then multi-factor authentication again may be needed to resume or begin a new session.

Some implementations may further include location-based control functionality such that a device is permitted to operate within one or more physical locations (e.g., a geographical or geophysical location) and/or restricted from operating outside of the location(s). Or similarly, a session conducted by a partner employee is permitted or restricted based on the location of the session. In one example implementation, the retail partner employee device application may receive an indication of the location of the device (or location of the partner employee or location of the session). The location indication received by the retail partner employee device application may be determined, by way of example and without limitation, using location-detection functionality of the device (e.g., GPS, Wi-Fi or wireless network signal detection, or other indoor location detection technology), or location may be inferred based on information about a network connection of the device, such as GoIP information, network domain, or Wi-Fi network the device is connected to, or inferred from other data determined or received by the device. The received location indication may be compared to a pre-determined geographical location (or area) to determine whether operation is permitted or restricted. In particular, one or more permitted locations or location areas, such as a location of a retail store or warehouse of the retail partner, may be pre-determined so that a session may be permitted to occur where the location of the device (or location of the partner employee or the session) is determined to be at a permitted location area. Additionally or alternatively, a session may be restricted if the device location is not within one of the permitted location areas. A session may be permitted or restricted, for instance, by permitting or blocking operations of the retail partner employee device application. In some implementations, geofencing may be utilized to identify permitted locations or location areas of operation, and may be determined in advance or based on the location of the device at the time of authentication. In this way, if the device and an NFC-equipped badge are stolen, even after a legitimate user has been authenticated and logged into the retail partner employee device application, the illegitimate user would be unable to use the application outside of the permitted locations or location areas. In one implementation, where it is determined that the location of the device (or location of the partner employee or the session) is outside a permitted location area, then the retail partner employee device application may prompt the user (e.g., the partner employee) for authentication, which may be either multi-factor authentication or single-factor such as the employee's credentials, and which be based on a security setting.

After the partner employee has been authenticated, the retail partner computing system 414, which has been issued a token by the manufacturer, may issue a token for the partner employee. That token may be used to generate an output, such as a visual marking, that can be printed at printer 418 and/or digitally written to an employee's name badge 420.

As mentioned, the employee badge 420 may be a digital badge. For example, it may include an electronic ink screen (which may be one of a variety of sizes), as well as an NFC chip that facilitates rendering an image at the electronic ink display of the badge. For example, the employee may swipe the badge over a writer equipped with NFC technology (such as a peripheral attached to the retail partner computing system 414), and the badge may be programmed with relevant media for the employee (e.g., name, title, and visual marking, as well as marketing material, such as, "Ask me about our new Product X"). The badge may also include a lanyard or a magnet so that the badge can be worn by the employee. In an example, a USB interface may be used in addition to, or instead of, NFC technology to facilitate communication between the employee badge 420 and a computing device, such as the retail partner computing system 414.

The visual marking may be utilized by the employee as a means for presenting credentials needed for quorum-controlled data access. As described above, the visual marking may expire at the end of the employee's shift or upon the occurrence of some other conditions. In some instances, the badge may continue to display the visual marking, but it may be rendered inactive such that it may no longer be used to gain access to quorum-controlled data. Additionally or alternatively, the credentials needed for quorum-controlled data access may be provided via an NFC badge encoded with employee credentials (in a manner similar to that discussed above with respect to authentication mechanisms). For example, a token containing the employee credentials may be provided as an NFC output. Such token may be used in combination with other factors, such as a time-limited PIN, to provide the credentials needed for quorum-controlled data access.

Finally, turning to the customer, a customer device application may be used to demonstrate to the manufacturer that the customer has given permission to access the customer's data. A customer identifier, such as a visual marking, within the application may be used for this purpose. The customer may have username and password credentials that are used to authenticate the customer (e.g., by the manufacturer computing system 208 and/or a delegate thereof). The customer device application may establish trust with the customer's account (e.g., by the retail partner computing system and/or the manufacturer computing system). The duration of a communication session involving the customer device may be controlled through TTL parameters. The customer device application provides the added benefits of a secure customer identification and promoting customers to use the manufacturer's application.

Having described exemplary aspects of the retail partner, retail partner employee, customer, and/or their respective devices and device software, a brief overview of what might constitute a quorum for different types of data will now be described. For public retail data (e.g., public product information), such data may be accessible with nothing more than an active token at the retail partner computing system (e.g., the token issued by the manufacturer computing system 208 to enable the retail partner computing system to provision devices and delegate access to employees). For restricted retail data (e.g., sales data, checkout functionality, experience tools, local inventory data), access to such data may require an active token at the retail partner computing system and at the retail partner employee device. For customer data (e.g., personally identifiable data, purchase history, payment information, account additions or changes), access to such data may require an active token at the retail partner computing system and at the retail partner employee device, as well as customer consent (e.g., in the form of the customer presenting a customer identifier). Finally, certain data and functionality may be so sensitive that they require an override and/or may only be accessed by certain employees (e.g., supervisors or managers). This may include sensitive data about a customer, the ability to process returns and exchanges, and administrative functionality, for example. In this instance, a second partner employee device token may be needed to satisfy a quorum, in addition to customer consent and tokens at the retail partner computing system and the retail partner employee device.

Turning now to FIGS. 5A-D, a series of exemplary interactions in a retail context are illustrated. In exemplary scenario 500A, a customer 502 visits a retail partner store and asks an employee 504 about a pair of shoes. The data about the shoes is publicly available. The employee 504 can use the employee device 506 to access the publicly available data and tell the customer 502 about the shoes of interest. The employee 504 may need to enter a PIN to unlock the employee device 506, but because the data is publicly available, minimal security measures may be implemented. Because the employee device 506 has been provisioned by the retail partner, an associated retail partner computing system may have a token issued by the manufacturer (as explained elsewhere, such token may be needed in order to provision employee devices). An authorizer at the manufacturer computing system 508 may grant access to the data. Additionally or alternatively, a component at the retail partner computing system may act as a delegate of the manufacturer computing system 208 and grant such access.

In exemplary scenario 500B, the customer 502 asks about the customer's previous preferred fit. Accessing the customer's purchase history and product interest data (which includes personally identifiable information) may require the customer's consent, in addition to active tokens issued to the retail partner employee device 506 and the retail partner computing system. The employee 504 may prompt the customer to provide a customer identifier, such as a visual marking on the customer device 510 (while QR Code® customer identifiers are depicted in the figures for illustration purposes, it is contemplated that any customer identifier provided herein may be leveraged in connection with the examples provided by the figures). The customer may log into the manufacturer app on the customer device 510 and obtain a customer identifier for sharing with the employee 504. If the identifier takes the form of a visual marking, the employee 504 may scan the visual marking using the employee device 506 or another device associated with the retail partner (the employee may need to first enter a PIN to unlock such device). Additionally, the employee 504 must be authenticated with the retail partner computing system and/or the manufacturer computing system in order to obtain a token. In an example, upon obtaining a token, a secure session is initiated and the employee device 506 may communicate the customer identifier and a query for customer data to the retail partner computing system and/or the manufacturer computing system. The employee device 506 may then receive the queried customer data and provide the requested information to the customer 502. As previously described, this data access may also be granted based on the employee inputting the customer identifier (e.g., scanning a visual marking presented at the customer device 510) and inputting an output that is generated based on the token issued to the employee device 506 (e.g., scanning a visual marking that is printed on the employee's badge). In either instance, if the quorum is satisfied, an authorizer at the manufacturer computing system 512 may grant access to the data. Additionally or alternatively, a component at the retail partner computing system may act as a delegate of the manufacturer and grant such access. The controlled granting of such access facilitates an enhanced, personalized retail experience for the customer 502.

In exemplary scenario 500C, the customer 502 asks whether the store has a size 9 in stock. Accessing the local inventory data may require active tokens issued to the retail partner employee device 506 and the retail partner computing system. Thus, to access local inventory data, the employee 504 may enter a PIN to unlock the employee device 506. The employee 504 is authenticated with the retail partner computing system and/or the manufacturer computing system in order to obtain a token (the employee 504 may still be authenticated from the interaction in scenario 500B if the token has not yet expired, but if the token has expired, re-authentication may be necessary). In an example, if the child token has not yet expired, or if the re-authentication has occurred and a new token has been granted, then a secure session is open and the employee device 506 may retrieve the inventory data. Again, as previously described, this data access may also be granted based on the employee inputting an output that is generated based on the token issued to the employee device 506 (e.g., scanning a visual marking that is printed on the employee's badge). In either instance, if the quorum is satisfied, an authorizer at the manufacturer computing system 514 may grant access to the data. Additionally or alternatively, a component at the retail partner computing system may act as a delegate of the manufacturer and grant such access.

In exemplary scenario 500D, the customer 502 has selected a pair of shoes 516 and would like to pay for them using payment information that is on file with the manufacturer. Accessing the customer's payment information may require customer consent (e.g., as manifested by providing a customer identifier), in addition to active tokens issued to the retail partner employee device 506 and the retail partner computing system. This may be accomplished in the manner described above with respect to FIG. 5B. In another example, rather than repeat all of the steps already performed in FIG. 5B (e.g., scanning a visual marking presented at the customer device 510), the customer 502 may receive a push notification at the customer device 510 requesting that the customer confirm approval of the payment. This may be a more convenient option for the customer 502 when the customer 502 is engaging in a series of interactions with the employee 504 in a relatively short period of time. In either instance, if the quorum is satisfied, an authorizer at the manufacturer computing system 518 may grant access to the data. Additionally or alternatively, a component at the retail partner computing system may act as a delegate of the manufacturer and grant such access. Upon processing of the payment information, the shoes 516 may be released to the customer 502 and the customer 502 may be given a physical or electronic receipt.

Figure 6B:
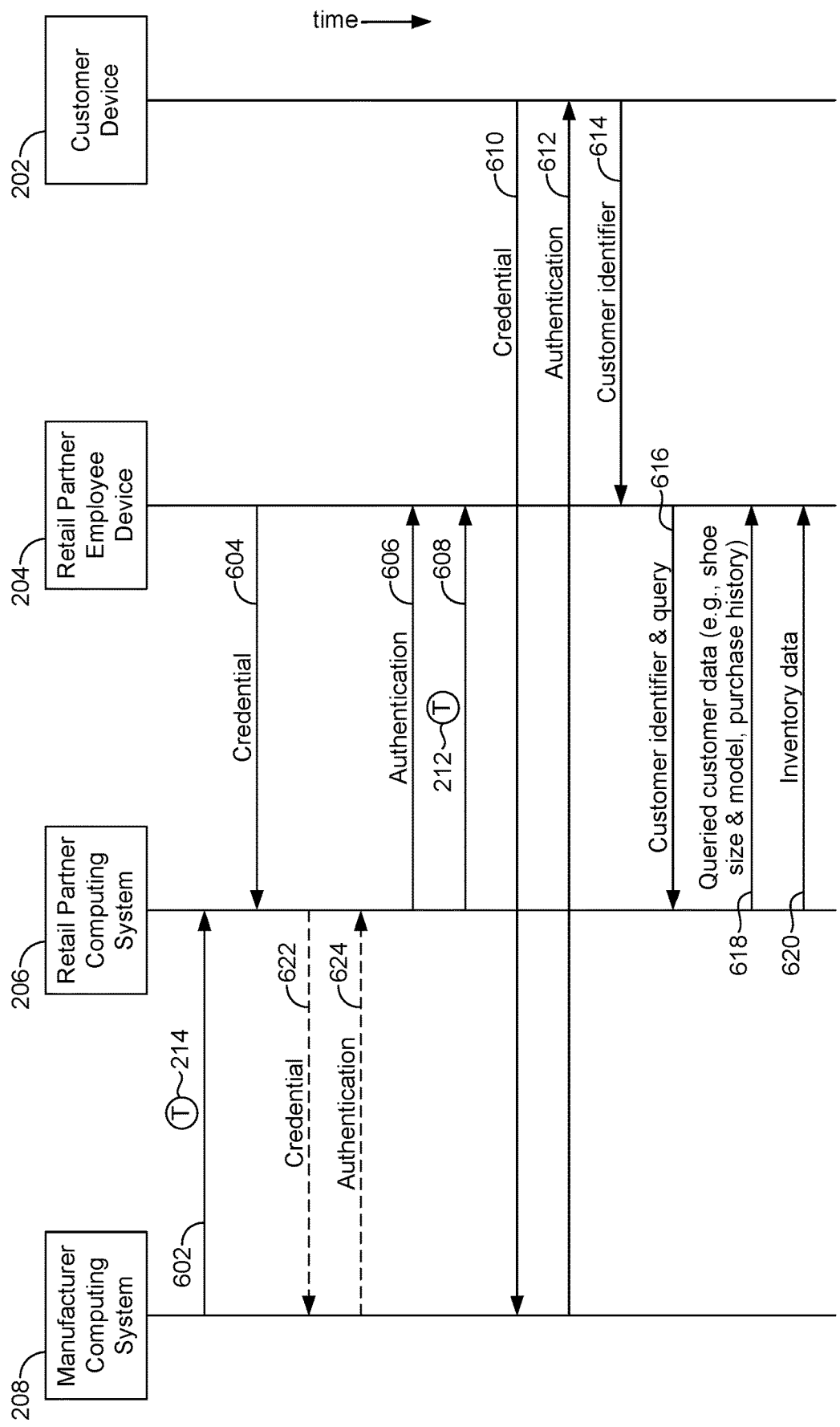

Turning now to FIGS. 6A-D, exemplary communication flows 600A-D among the customer device 202, retail partner employee device 204, retail partner computing system 206, and manufacturer computing system 208 of FIG. 2A are illustrated. FIGS. 6B-D include some communications similar to those shown in FIG. 6A (as indicated by the solid lines and like reference numerals), as well as additional communications (as indicated by the dashed lines). It is understood that communication flows 600A-D are exemplary only and that other communication flows are included within the scope hereof. For example, communications other than those illustrated may occur and/or some of the illustrated communications may be omitted. The communications may be implemented via application programming interface (API) calls or other means of communication.

In step 602 of FIG. 6A, the authorizer 218 grants a digital credential—e.g., token 214—to the retail partner computing system 206. In steps 604 and 606 of FIG. 6A, the retail partner employee device 204 communicates a credential for the employee to retail partner computing system 206, which then authenticates the employee and provides an indication of the authentication to the employee device 204. In step 608, based on the authentication, the token 212 is provided to the employee device 204. Such communications between the retail partner computing system 206 and the retail partner employee device 204 may occur over any number of networks, including a virtual private cloud of the retail partner.

The communication flow 600B of FIG. 6B illustrates additional or alternative communications for authenticating the retail partner employee device 204 by the manufacturer computing system 208. Specifically, in communication flow 600B, after the employee credential is communicated from the employee device 204 to the retail partner computing system 206 at step 604, the retail partner computing system 206 communicates the credential to the manufacturer computing system 208 at step 622. The manufacturer authenticates the employee and provides an indication of the authentication to the retail partner computing system 206 at step 624. The retail partner computing system 206 then provides an indication of the authentication to the retail partner employee device 204 at step 606, and the token 212 is provided at step 608. Additionally or alternatively, the employee device 204 may be authenticated directly by the manufacturer computing system 208 without utilizing the retail partner computing system 206 as an intermediary, and/or the manufacturer computing system 208 may issue the token 212 to the retail partner employee device 204.

As explained above with respect to FIG. 2A, the provision of token 212 at step 608 in FIG. 6A may constitute the start of a secure communication session between the employee device 204 and the retail partner computing system 206 and/or the manufacturer computing system 208. The session may continue until the token 212 expires, is revoked, or otherwise becomes inactive.

As also explained above, certain access is conditioned upon obtaining the consent of the customer whose data is to be retrieved, and such consent may be manifested by the provision of a customer identifier via an app linked with the manufacturer computing system 208. Accordingly, at step 610 in FIG. 6A, the customer may enter a credential at the customer device 202, such as a login credential for the manufacturer's app. The credential is then provided to the manufacturer computing system 208 for authentication. This may occur over any number of networks, including a virtual private cloud of the manufacturer. An indication of the authentication is provided at step 612. Once the customer has been authenticated (e.g., logged into the manufacturer's app), the customer may use the app to provide his customer identifier to the employee device 204 at step 614.

At step 616, the employee device sends the customer identifier and a query for customer data to the retail partner computing system 206. The query might specify the particular data that is desired (e.g., most recent purchase) or might include a more comprehensive request for all purchase history data. If the communication session is still open (e.g., if the token 212 is still valid), then the retail partner computing system 206 will respond to the employee device 204 with the queried customer data at step 618. Again, such communications between the retail partner computing system 206 and the retail partner employee device 204 may occur over any number of networks, including a virtual private cloud of the retail partner. The employee may then share the information with the customer and assist the customer in making a purchase via a personalized retail experience.

The communication flow 600C of FIG. 6C illustrates additional communications for querying the manufacturer computing system 208 and receiving the queried data. Specifically, in communication flow 600C, after the retail partner computing system 206 receives the customer identifier and query at step 616, the retail partner computing system 206 communicates the customer identifier and query to the manufacturer computing system at step 626. The queried data is provided to the retail partner computing system 206 by the manufacturer computing system 208 (e.g., authorizer 218) at step 628. The queried data is then provided to the employee device 204 at step 618. As another example, the employee device 204 may send the customer identifier and query directly to the manufacturer computing system 208, and in response, the manufacture computing system 208 (e.g., authorizer 218) may provide the queried data to the employee device 204. In any event, the access is conditioned on a quorum of active tokens and customer consent.

The retail partner computing system 206 may also send inventory data at step 620. The inventory data may have been requested in the query at step 616, or the retail partner computing system 206 may include predictive logic indicating that inventory data is likely to be requested subsequent to the request for customer data, and rather than wait for the request, the retail partner computing system 206 may proactively provide the inventory data.

The communication flow 600D of FIG. 6D illustrates additional communications for obtaining inventory data. Specifically, in communication flow 600D, inventory data is provided by the manufacturer computing system 208 to the retail partner computing system 206 at step 630. The inventory data may be provided to the employee device 204 at step 620. Additionally or alternatively, the inventory data may be provided by the manufacturer computing system 208 directly to the employee device 204.

Turning to FIGS. 7-8, flow diagrams are provided illustrating example methods 700 and 800, respectively, for controlling access to a secure computing resource. Each block or step of method 700 and 800, as well as other methods described herein, comprises a computing process that may be performed using any combination of hardware, firmware, and/or software. For instance, various functions may be carried out by a processor executing instructions stored in memory. The methods may also be implemented as computer-usable instructions stored on computer storage media. The methods may be provided by a stand-alone application, a service or hosted service (stand-alone or in combination with another hosted service), or a plug-in to another product, to name a few. Accordingly, methods 700 and 800 may be performed by one or more computing devices, such as a smart phone or other user device, a server, by a distributed computing platform, such as in the cloud, or other computing device such as computing 1000, described in connection to FIG. 10. In an example, method 700 may be performed by components of the retail partner employee device 204 of FIG. 2A and method 800 may be performed by the retail partner computing system 206 and/or manufacturer computing system 208 of FIG. 2A.

At step 710, a first device (e.g., the retail partner employee device 204 of FIG. 2A) receives a child token (e.g., token 212) from a second device (e.g., retail partner computing system 206) having a parent token (e.g., token 214). As described above, the child token may grant the first device access to a subset of data accessible to the second device having the parent token. The parent token may be granted to the second device by a fourth device (e.g., manufacturer computing system 208, including a component thereof, such as authorizer 218), and the parent token may grant the second device access to a portion of data stored at the fourth device (e.g., stored at storage component 216). The parent token and/or the child token may be subject to time- and location-based conditions. For example, a token may expire after a predetermined period of time. In an implementation, the child token may initiate a secure communication session between the first device and the second device, and the secure communication session may expire after a predetermined period of time (e.g., based on the lifespan of the token). A location-based condition may include rendering a token inactive in response to an associated device crossing a predetermined geographic boundary (e.g., leaving the premises of a retail partner store).

At step 720, the first device receives an indication of a user identifier for a user. This indication may be received from a third device (e.g., customer device 202) associated with the user. The indication of the user identifier may be provided based on a degree of physical proximity between the first device and a third device associated with a user satisfying a threshold proximity. For example, as described above, when the user identifier comprises a code (e.g., a visual marking) that is to be scanned by the retail partner employee device, the user device and the retail partner employee device must be close enough to one another to permit the scanning. Furthermore, the user may be authenticated by a fourth device (e.g., manufacturer computing system 208, components thereof, such authorizer 218, and/or delegates thereof, such as retail partner computing system 206). The indication of the user identifier may be generated by an application communicatively coupled to the fourth device (e.g., an application developed, released, and/or managed by the manufacturer computing system 208), and the indication of the user identifier may be generated based on the authentication of the user by the fourth device.

At step 730, the first device sends or transmits a request for access to a secure computing resource associated with the user. The first device may send such request to the second device—e.g., the retail partner employee device 204 may send such request to the retail partner computing system 206. In an example, the retail partner computing system 206 may further send the request to the manufacturer computing system 208 (e.g., to authorizer 218), and the manufacturer computing system 208 may process the request for access. Additionally or alternatively, the request may be sent directly from the retail partner employee device 204 to the manufacturer computing system 208. The request may include an indication of the user identifier and an indication of the secure computing resource. The secure computing resource may comprises data regarding the user.

At step 740, the first device may receive access to the secure computing resource. Such access may be based on the child token and the indication of the identifier. For example, as described above, the manufacturer computing system 208

(e.g., authorizer 218) and/or the retail partner computing system 206 may confirm that a quorum of token requirements and/or customer consent has been satisfied before granting access to the secure computing resource.

In the exemplary method 700, the fourth device may be associated with a manufacturer of a product, the second device may be associated with a retail partner of the manufacturer, the first device may be associated with an employee of the retail partner, and the user may comprise a consumer of the product.

With reference now to FIG. 8, a flow diagram is provided illustrating an example method 800 for controlling access to a secure computing resource. At step 810, a parent token (e.g., token 214) is received at a first device (e.g., retail partner computing system 206). The parent token grants access to a portion of data stored at a data storage component (e.g., storage component 216). The parent token may be issued by authorizer 218.

At step 820, a child token (e.g., 212) is issued to a second device (e.g., retail partner employee device 204). Such issuance may be based on an authentication of the second device. The child token grants the second device access to a subset of data accessible to the first device having the parent token. In an example, the child token may be issued to the second device by the manufacturer computing system 208 (e.g., authorizer 218) or a delegate thereof, such as retail partner computing system 206. The parent token and/or child token may be subject to time- and/or location-based conditions. An example of a time-based condition is expiration after a predetermined period of time. The child token may initiate a secure session between the second device and the first device (e.g., retail partner employee device 204 and retail partner computing system 206, as well as manufacturer computing system 208). The secure session may expire after a predetermined period of time.

At step 830, an indication comprising a user identifier is received. The indication may indicate that a degree of physical proximity between the second device and a third device (e.g., customer device 202) satisfies a threshold proximity, as described above.

At step 840, a request for access to a secure computing resource is received. Such request may be received by the retail partner computing system 206 and/or the manufacturer computing system 208 (e.g., authorizer 218).

At step 850, access to the secure computing resource is granted. Such access may be granted by the retail partner computing system 206 and/or the manufacturer computing system 208 (e.g., authorizer 218). Such access may be based on the child token and the indication of the identifier. For example, as described above, the manufacturer computing system 208 (e.g., authorizer 218) and/or the retail partner computing system 206 may confirm that a quorum of token requirements and/or customer consent has been satisfied before granting access to the secure computing resource.

In the exemplary method 800, the data storage component may be controlled by a manufacturer of a product, the first device may be controlled by a retail partner of the manufacturer, the second device may be operated by an employee of the retail partner, and the user may be a consumer of the product.

Figure 9:
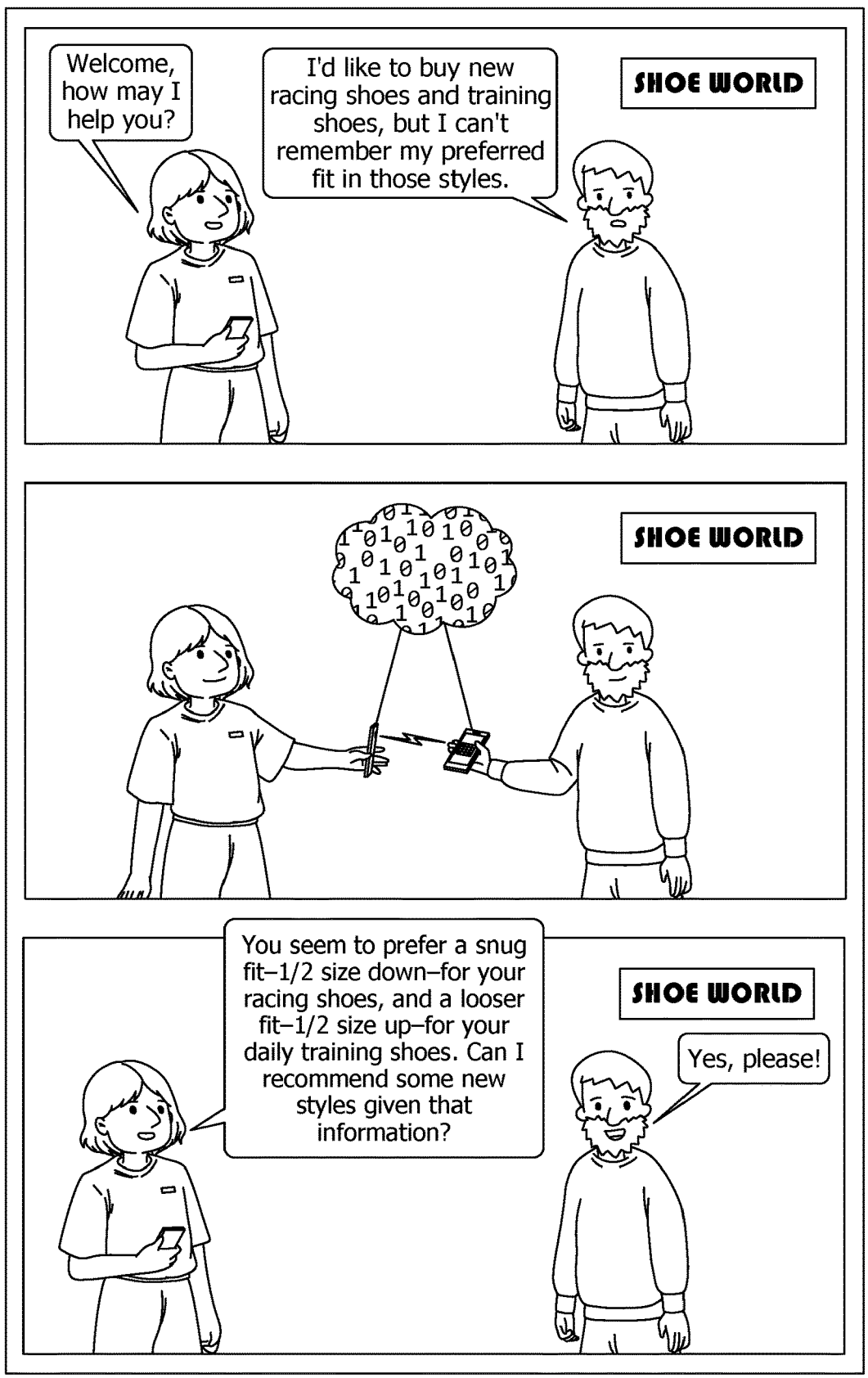
FIG. 9 illustrates a series of exemplary interactions in a retail context, in accordance with aspects of the technology described herein.

Turning now to FIG. 9, a series of exemplary interactions in a retail setting are illustrated. These interactions may involve various components and/or may implement various methods discussed above.

As evidenced by the foregoing, the technology described herein allows retail partners to access data stored by a manufacturer for the purpose of providing customers with an enhanced retail experience, while also providing the manufacturer with granular control over access to the data and minimizing the risk of the data being lost or compromised. The authentication pattern described herein leverages strong user identification to create a multi-factor customer engagement model that is flexible enough to facilitate a modern customer sales transaction. And a manufacturer's conditional access policies allow the owner/manager of the data (e.g., the manufacturer) to dictate the who, what, and where of data access and retrieval. The technology described herein may also provide for enhanced global inventory lookup and management, as well as enable the collection of additional data from the manufacturer's supply chain, such as attribution information for retail partner sales. Overall, greater ease in controlling, handling, and protecting customer data is provided. For example, an automated process provides a high level of data security and enables customers to be in charge of their data, while also providing controlled access to the data to certain partners.

The technology described herein offers advantages for manufacturers with a diverse and dispersed workforce. For example, the workforce may be diverse in that it includes manufacturer employees, retail partner employees, and agency and contract employees. The workforce may be dispersed in that these individuals are located all over the world. The technology described herein enables the manufacturer (and its diverse and dispersed workforce) to deliver an exceptional retail experience to every customer by controlling access by various individuals in the workforce to a wide range of data, including publicly available product information, restricted sales and inventory data, and sensitive customer data like personally identifiable information and payment information. The technology descried herein is flexible and scalable and may be implemented on a variety of platforms, including mobile and cloud platforms.

Although the subject technology is described herein with reference to a manufacturer, retail partner, and consumer, it is understood that this scenario is exemplary only. As discussed with respect to FIG. 2B, the technology described herein may be applied to any context in which an entity that stores third-party data is controlling access to such data by another entity. It could be applied to another scenario in the supply chain context, such as managing and sharing inventory data among numerous entities, as well as scenarios outside of the supply chain context. For example, the relevant data may be health and fitness data that is collected by a user's personal device (e.g., a smartphone or a wearable device) and that is stored at a computing system of a service provider (e.g., an entity associated with an app that manages the user's health and fitness data). The service provider may offer a central repository for health and fitness data to help users train smarter and more efficiently and may also utilize artificial intelligence to make training recommendations and suggest relevant products. The technology described herein may be used to protect and manage the data and to control access to the data by physicians, personal trainers, or other individuals or entities to whom the user desires the data to be accessible, thus enabling a user to securely share/delegate access to the data to specific partners. In this example, the secure computing resource might include full user profiles, of which historic workout data is one piece. The secure computing resource might also include items that have been tagged by the user as used at or for certain events or moments of interest (e.g., training for a marathon, a friend's party, a special trip). Such data may be used to personalize the suggestion of relevant products, for example.

Having described various implementations, an exemplary computing environment suitable for implementing aspects of the disclosure is now described. With reference to FIG. 10, an exemplary computing device is provided and referred to generally as computing device 1000. The computing device 1000 is but one example of a suitable computing environment and is not intended to suggest any limitation as to the scope of use or functionality of aspects of the disclosure. Neither should the computing device 1000 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

Figure 10:
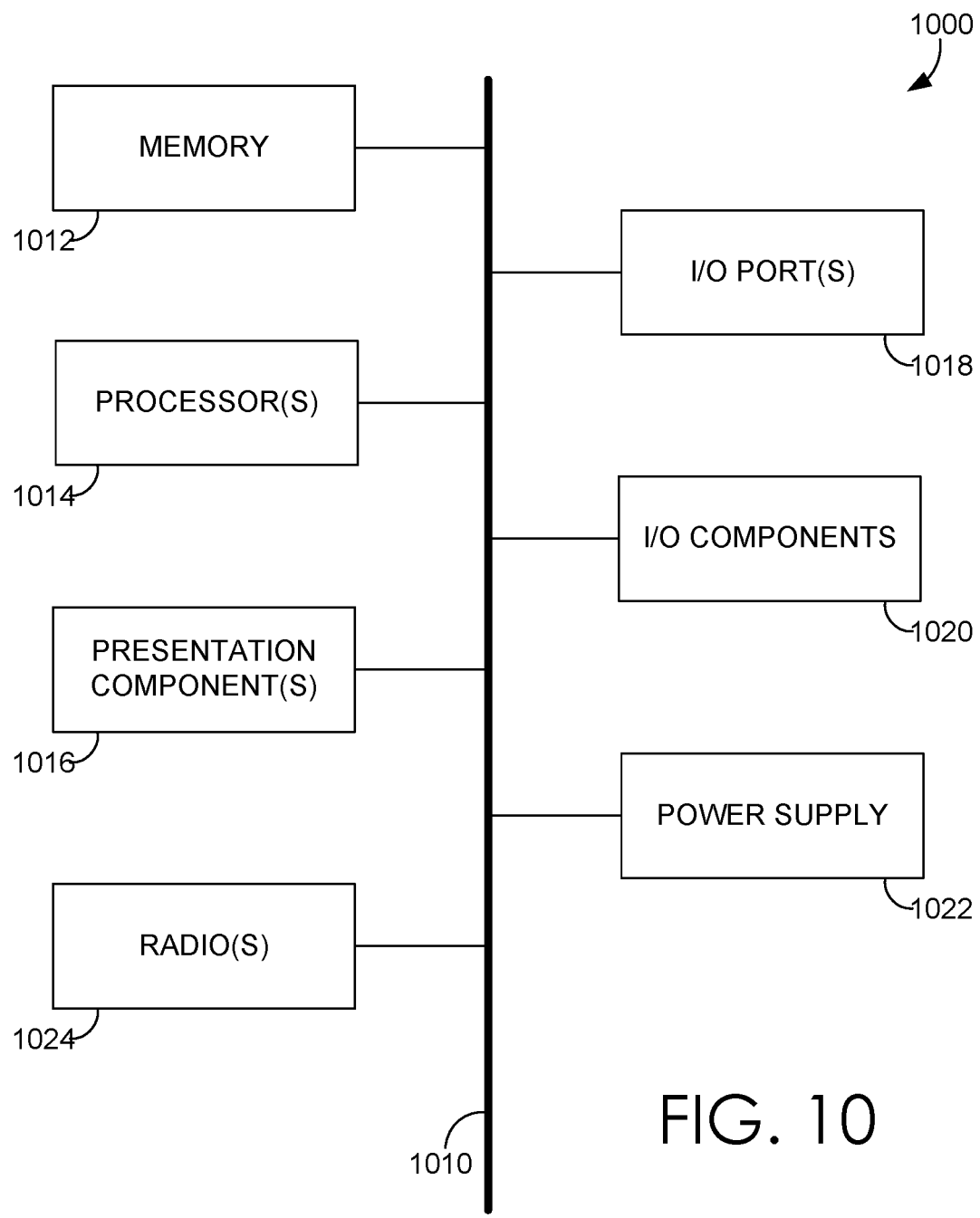
FIG. 10 is a block diagram of an exemplary computing environment suitable for implementing aspects of the technology described herein.

With reference to FIG. 10, computing device 1000 includes a bus 1010 that directly or indirectly couples the following devices: memory 1012, one or more processors 1014, one or more presentation components 1016, one or more input/output (I/O) ports 1018, one or more I/O components 1020, and an illustrative power supply 1022. Bus 1010 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 10 and with reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors 1014 that read data from various entities such as memory 1012 or I/O components 1020. Presentation component(s) 1016 presents data indications to a user or other device. Examples of presentation components may include a display device, speaker, printing component, vibrating component, and the like.

The I/O ports 1018 allow computing device 1000 to be logically coupled to other devices, including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Some implementations of computing device 1000 may include one or more radio(s) 1024 (or similar wireless communication components). The radio 1024 transmits and receives radio or wireless communications. The computing device 1000 may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short"

and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A computerized system comprising: one or more processors; and one or more computer storage media storing computer-useable instructions that, when executed by the one or more processors, cause the one or more processors to perform operations comprising: at a first device: receiving a child token from a second device having a parent token, wherein the child token grants the first device access to a subset of data accessible to the second device having the parent token, based on a degree of physical proximity between the first device and a third device associated with a user satisfying a threshold proximity, receiving from the third device an indication of a user identifier for the user, sending to the second device a request for access to a secure computing resource associated with the user, the request comprising the indication of the user identifier and an indication of the secure computing resource, and based on the child token and the indication of the identifier, receiving access to the secure computing resource associated with the user.

Clause 2. The system of clause 1, wherein the user is authenticated by a fourth device.

Clause 3. The system of any of the preceding clauses, wherein the indication of the user identifier is generated by an application communicatively coupled to the fourth device, and wherein the indication of the user identifier is generated based on the authentication of the user by the fourth device.

Clause 4. The system of any of the preceding clauses, wherein the parent token is granted to the second device from the fourth device, and wherein the parent token grants the second device access to a portion of data stored at the fourth device.

Clause 5. The system of any of the preceding clauses, wherein the fourth device is associated with a manufacturer of a product, the second device is associated with a retail partner of the manufacturer, the first device is associated with an employee of the retail partner, and the user comprises a consumer of the product.

Clause 6. The system of any of the preceding clauses, wherein the child token expires after a predetermined period of time.

Clause 7. The system of any of the preceding clauses, wherein the child token initiates a secure session between the first device and the second device.

Clause 8. The system of any of the preceding clauses, wherein the secure session expires after a predetermined period of time.

Clause 9. The system of any of the preceding clauses, wherein the parent token and the child token are subject to time- and location-based conditions.

Clause 10. The system of any of the preceding clauses, wherein the secure computing resource comprises data regarding the user.

Clause 11. A computerized method for providing controlled access to secure computing resources comprising: at a first device, receiving a child token from a second device having a parent token, wherein the child token grants the first device access to a subset of data accessible to the second device having the parent token; based on a degree of physical proximity between the first device and a third device satisfying a threshold proximity, receiving from the third device an indication of a user identifier for a user associated with the third device; sending to the second device a request for access to a secure computing resource associated with the user, the request comprising the indication of the user identifier and an indication of the secure computing resource; and based on the child token and the indication of the identifier, receiving access to the secure computing resource associated with the user.

Clause 12. The method of clause 11, wherein the child token is subject to time- and location-based conditions.

Clause 13. The method of any of the preceding clauses, wherein the time-based conditions comprise an expiration after a predetermined period of time.

Clause 14. The method of any of the preceding clauses, wherein the location-based conditions comprise rendering the child token inactive in response to the first device crossing a predetermined geographic boundary.

Clause 15. A computerized system comprising: one or more processors; and one or more computer storage media storing computer-useable instructions that, when executed by the one or more processors, cause the one or more processors to perform operations comprising: at a first device, receiving a parent token that grants access to a portion of data stored at a data storage component, based on authenticating a second device, issuing a child token by the first device to the second device, wherein the child token grants the second device access to a subset of data accessible to the first device having the parent token, receiving an indication that a degree of physical proximity between the second device and a third device associated with a user satisfies a threshold proximity, wherein the indication comprises a user identifier for the user, receiving a request for access to a secure computing resource associated with the user, and based on the child token and the indication of the user identifier, granting the second device access to the secure computing resource associated with the user.

Clause 16. The system of clause 15, wherein the child token initiates a secure session between the second device and the first device.

Clause 17. The system of any of the preceding clauses, wherein the secure session expires after a predetermined period of time.

Clause 18. The system of any of the preceding clauses, wherein the data storage component is controlled by a manufacturer of a product, the first device is controlled by a retail partner of the manufacturer, the second device is operated by an employee of the retail partner, and the user comprises a consumer of the product.

Clause 19. The system of any of the preceding clauses, wherein the parent token and the child token are subject to time- and location-based conditions.

Clause 20. The system of any of the preceding clauses, wherein the time-based conditions comprise an expiration after a predetermined period of time.

Many different arrangements of the various components depicted, as well as components not shown, are possible without departing from the scope of the claims below. Implementations of the disclosure have been described with the intent to be illustrative rather than restrictive. Alternative implementations will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computerized system comprising:
one or more processors; and
one or more computer storage media storing computer-useable instructions that, when executed by the one or more processors, cause the one or more processors to perform operations comprising:
at a first device:
receiving a child token from a second device having a parent token, wherein the child token grants the first device access to a subset of data accessible to the second device having the parent token,
based on a degree of physical proximity between the first device and a third device associated with a user satisfying a threshold proximity, receiving from the third device an indication of a user identifier for the user,
sending to the second device a request for access to a secure computing resource associated with the user, the request comprising the indication of the user identifier and an indication of the secure computing resource, and
based on the child token and the indication of the identifier, receiving access to the secure computing resource associated with the user.

2. The computerized system of claim 1, wherein the user is authenticated by a fourth device.

3. The computerized system of claim 2, wherein the indication of the user identifier is generated by an application communicatively coupled to the fourth device, and wherein the indication of the user identifier is generated based on the authentication of the user by the fourth device.

4. The computerized system of claim 2, wherein the parent token is granted to the second device from the fourth device, and wherein the parent token grants the second device access to a portion of data stored at the fourth device.

5. The computerized system of claim 2, wherein the fourth device is associated with a manufacturer of a product, the second device is associated with a retail partner of the manufacturer, the first device is associated with an employee of the retail partner, and the user comprises a consumer of the product.

6. The computerized system of claim 1, wherein the child token expires after a predetermined period of time.

7. The computerized system of claim 1, wherein the child token initiates a secure session between the first device and the second device.

8. The computerized system of claim 7, wherein the secure session expires after a predetermined period of time.

9. The computerized system of claim 1, wherein the parent token and the child token are subject to time- and location-based conditions.

10. The computerized system of claim 1, wherein the secure computing resource comprises data regarding the user.

11. A computerized method for providing controlled access to secure computing resources comprising:
at a first device, receiving a child token from a second device having a parent token, wherein the child token grants the first device access to a subset of data accessible to the second device having the parent token;
based on a degree of physical proximity between the first device and a third device satisfying a threshold proximity, receiving from the third device an indication of a user identifier for a user associated with the third device;
sending to the second device a request for access to a secure computing resource associated with the user, the request comprising the indication of the user identifier and an indication of the secure computing resource; and
based on the child token and the indication of the identifier, receiving access to the secure computing resource associated with the user.

12. The computerized method of claim 11, wherein the child token is subject to time- and location-based conditions.

13. The computerized method of claim 12, wherein the time-based conditions comprise an expiration after a predetermined period of time.

14. The computerized method of claim 12, wherein the location-based conditions comprise rendering the child token inactive in response to the first device crossing a predetermined geographic boundary.

15. A computerized system comprising:
one or more processors; and
one or more computer storage media storing computer-useable instructions that, when executed by the one or more processors, cause the one or more processors to perform operations comprising:
at a first device, receiving a parent token that grants access to a portion of data stored at a data storage component,
based on authenticating a second device, issuing a child token by the first device to the second device, wherein the child token grants the second device access to a subset of data accessible to the first device having the parent token,
receiving an indication that a degree of physical proximity between the second device and a third device associated with a user satisfies a threshold proximity, wherein the indication comprises a user identifier for the user,
receiving a request for access to a secure computing resource associated with the user, and
based on the child token and the indication of the user identifier, granting the second device access to the secure computing resource associated with the user.

16. The computerized system of claim 15, wherein the child token initiates a secure session between the second device and the first device.

17. The computerized system of claim 15, wherein the secure session expires after a predetermined period of time.

18. The computerized system of claim 15, wherein the data storage component is controlled by a manufacturer of a product, the first device is controlled by a retail partner of the manufacturer, the second device is operated by an employee of the retail partner, and the user comprises a consumer of the product.

19. The computerized system of claim 15, wherein the parent token and the child token are subject to time- and location-based conditions.

20. The computerized system of claim 19, wherein the time-based conditions comprise an expiration after a predetermined period of time.

\* \* \* \* \*